United States Patent [19]

Blonder

[11] 4,414,684

[45] Nov. 8, 1983

[54] METHOD AND APPARATUS FOR PERFORMING A COMPARISON OF GIVEN PATTERNS, IN PARTICULAR FINGERPRINTS

[75] Inventor: Alain Blonder, Lyons, France

[73] Assignee: Interlock Sicherheitssysteme GmbH, Stuttgart, Fed. Rep. of Germany

[21] Appl. No.: 219,802

[22] Filed: Dec. 24, 1980

[30] Foreign Application Priority Data

Dec. 24, 1979 [DE] Fed. Rep. of Germany ....... 2952402
May 19, 1980 [DE] Fed. Rep. of Germany ....... 3018998
Nov. 28, 1980 [DE] Fed. Rep. of Germany ....... 3044881

[51] Int. Cl.$^3$ ............................................. G06K 9/00
[52] U.S. Cl. .......................................... 382/4; 350/6.4; 356/71; 356/388; 382/32; 382/65
[58] Field of Search ............................ 356/71, 388–390, 356/398; 350/6.4; 340/825.3, 825.31, 825.32, 825.34, 146.3 E, 146.3 F; 235/467, 380, 487, 494; 382/4, 32, 65

[56] References Cited

U.S. PATENT DOCUMENTS

| | | | |
|---|---|---|---|
| 3,202,761 | 8/1965 | Bibbero | 340/146.3 E |
| 3,383,657 | 5/1968 | Claassen et al. | 340/146.3 E |
| 3,398,558 | 8/1968 | Benenati | 356/71 |
| 3,511,571 | 5/1970 | Ogle | 340/146.3 E |
| 3,694,240 | 9/1972 | Miller et al. | 356/71 |
| 3,928,842 | 12/1975 | Green et al. | 340/146.3 E |
| 4,048,618 | 9/1977 | Hendry | 340/146.3 E |
| 4,253,086 | 2/1981 | Szwarcbier | 340/146.3 E |

OTHER PUBLICATIONS

Rosell, "Prism Scanner," *Journal of the Optical Society of America*, vol. 50, #6, Jun. 1960, pp. 521–526.

Primary Examiner—Leo H. Boudreau
Attorney, Agent, or Firm—Edwin E. Greigg

[57] ABSTRACT

A method and an apparatus are proposed for performing a comparison of patterns of invariable form, especially fingerprint pattern. By the application of a finger on a prism within a beam of light, a latent picture of fingerprint lines is obtained which is optically compared with a copy of the same fingerprint stored in memory or located on a card. After conversion into an electrical variable, an identification pulse results which is subjected to at least one test criterion and compared with a threshold value. Preferably the testing of a master symbol located on the inserted card is effected at the same time, comparing this with a copy of the same stored in memory within the appliance. If the test criteria show an agreement of the fingerprint with the fingerprint copy and/or of the master symbol with the copy of the master symbol then a positive assessment is effected, and access to a building, for instance, is furnished.

60 Claims, 24 Drawing Figures

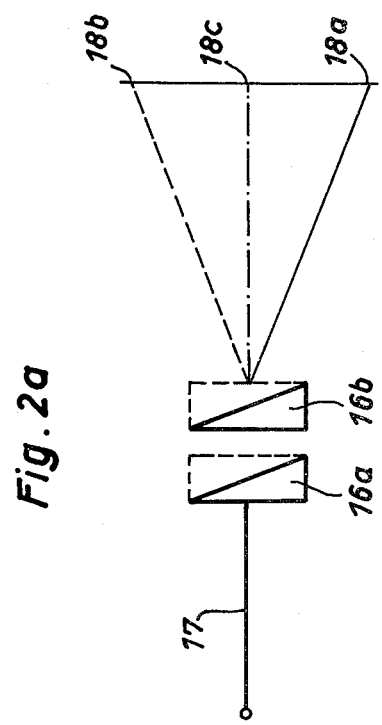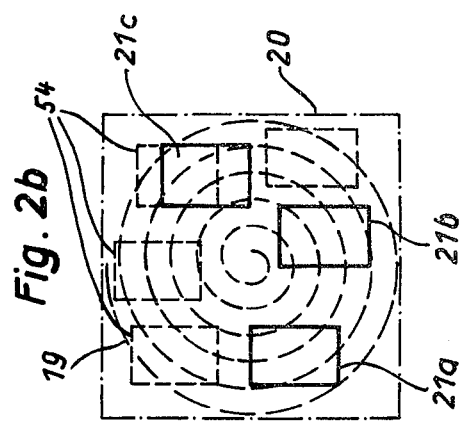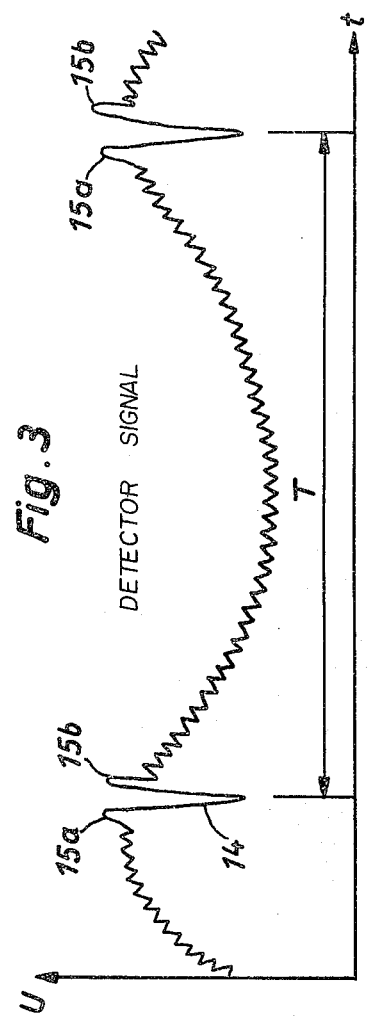

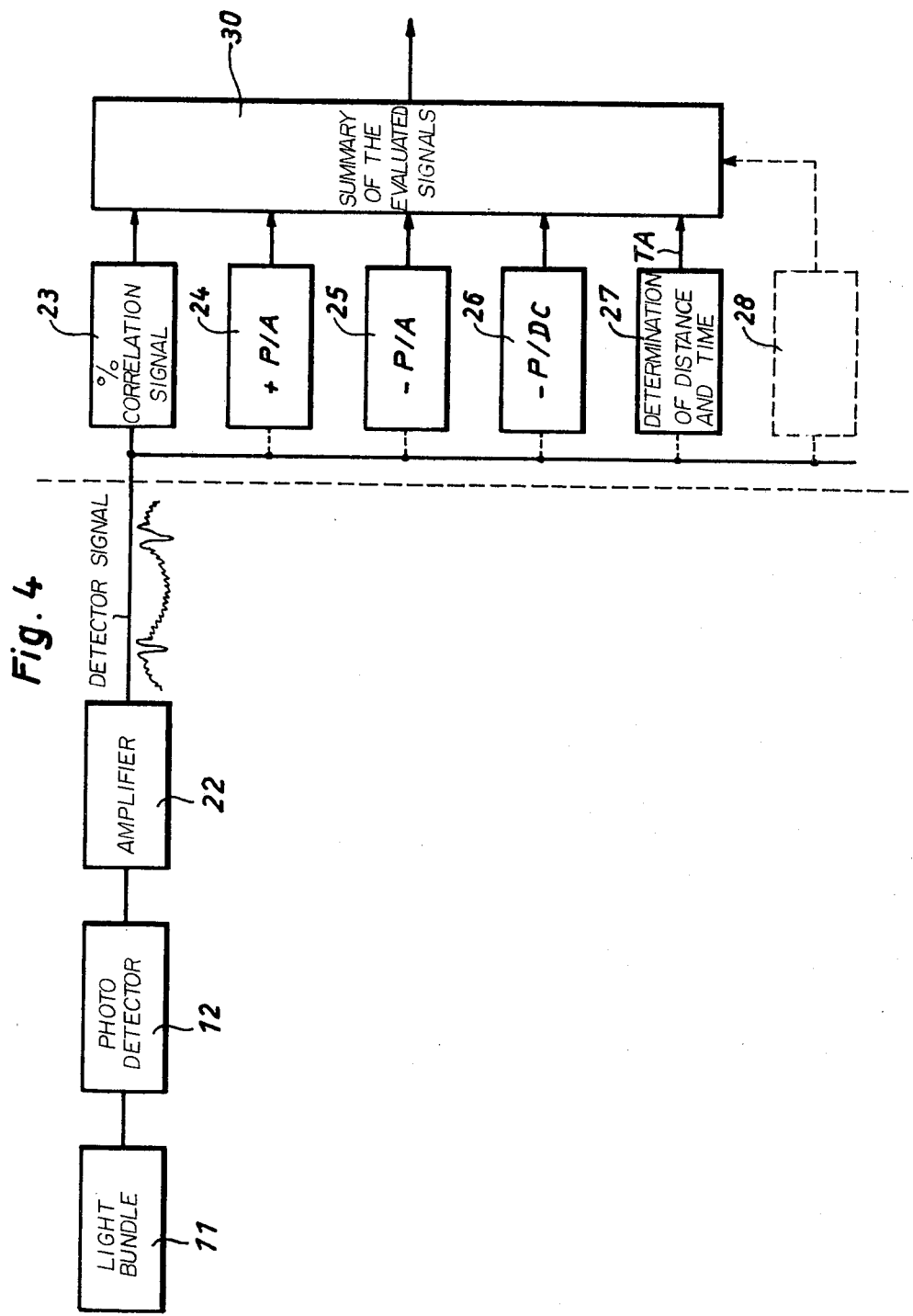

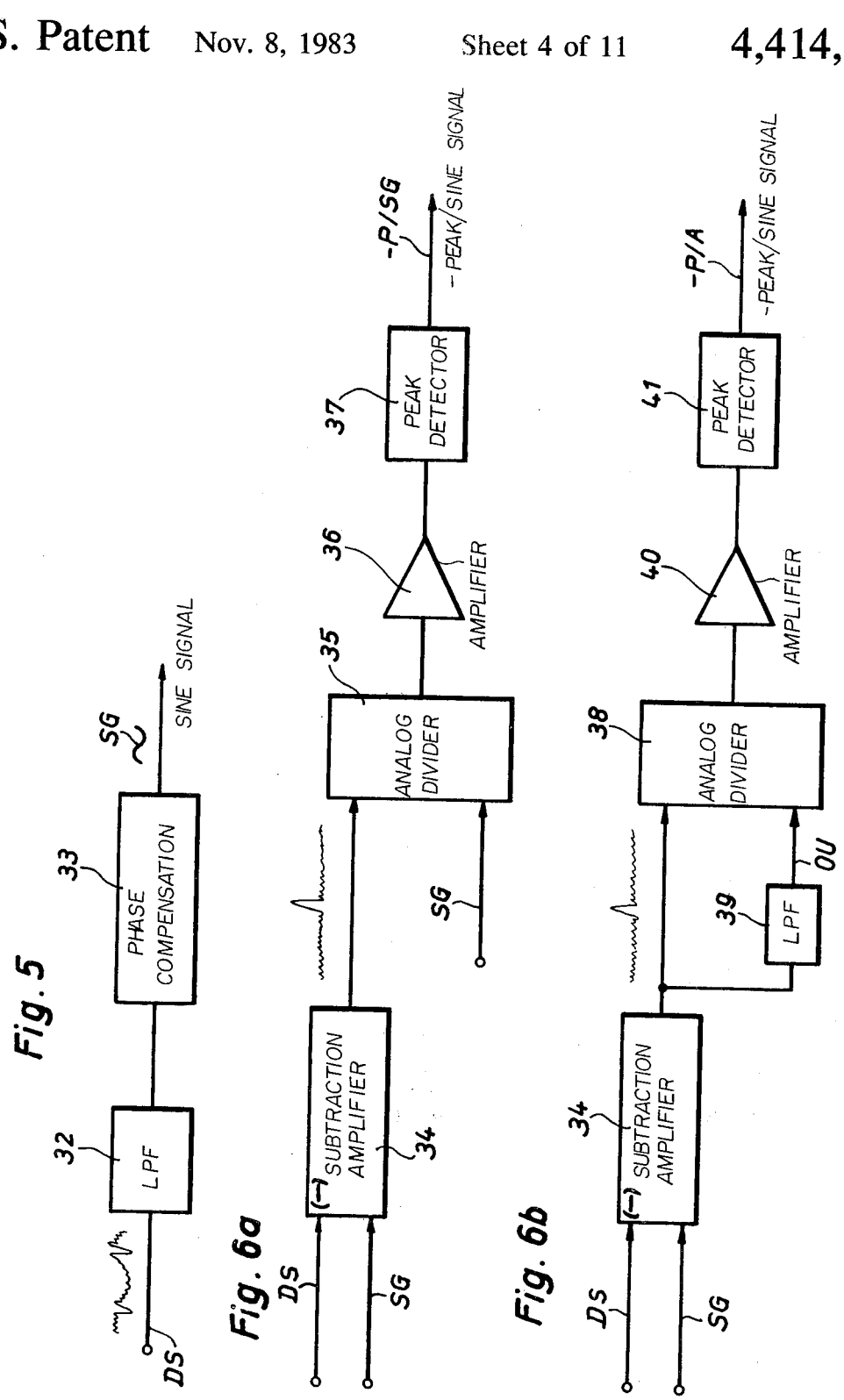

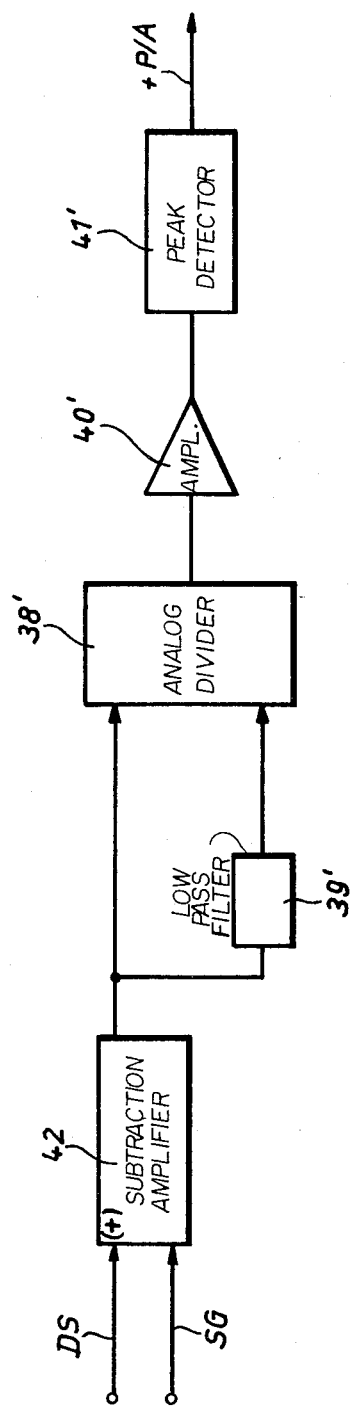
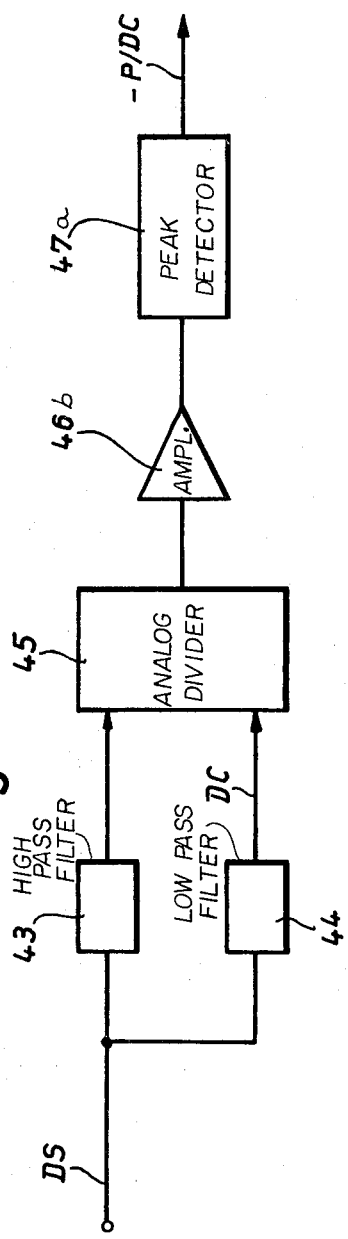

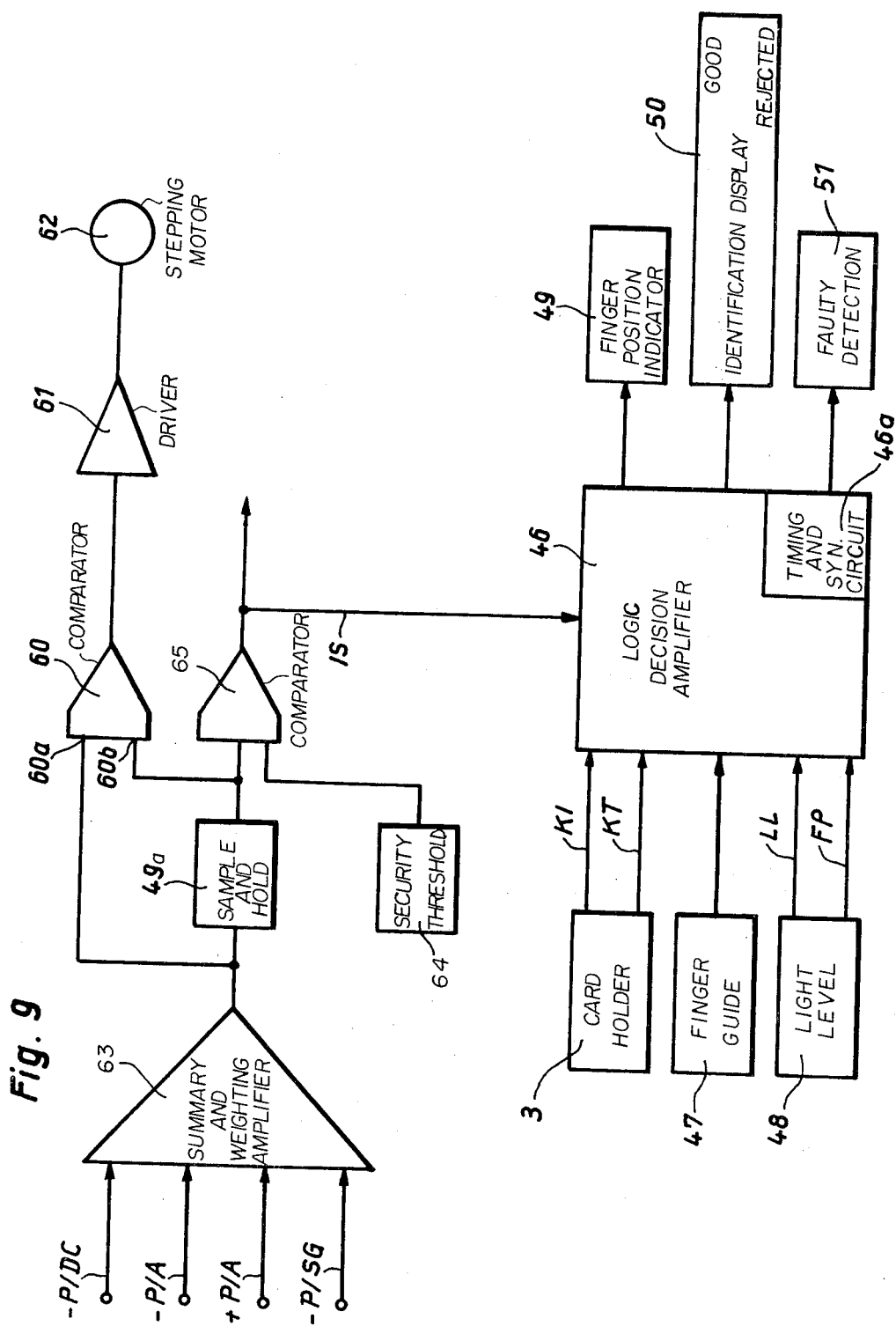

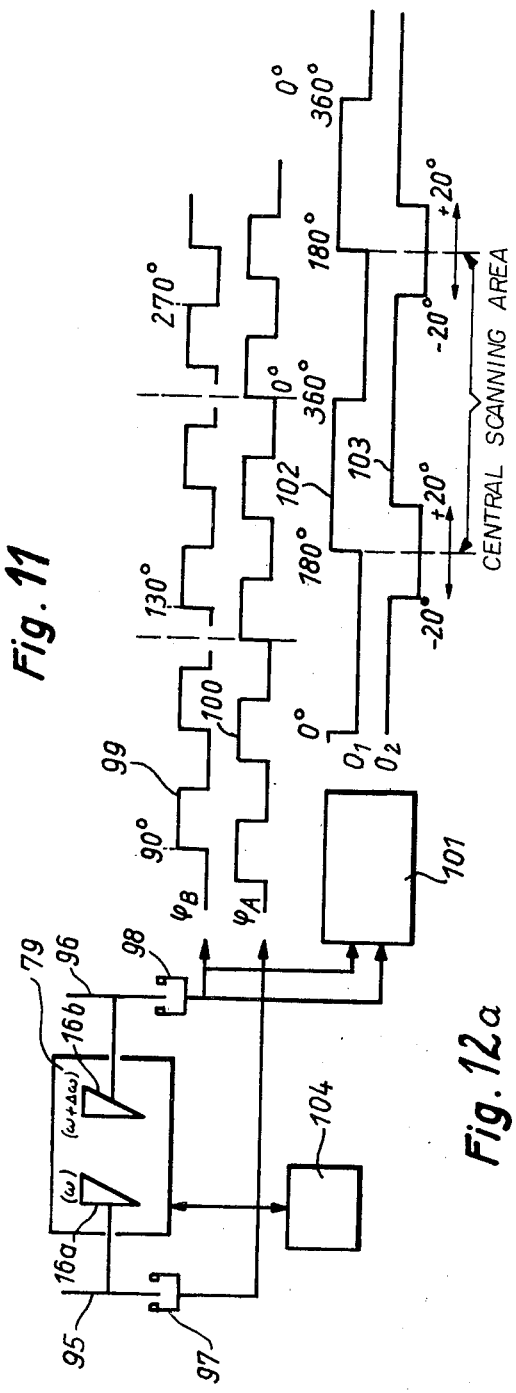
Fig. 11
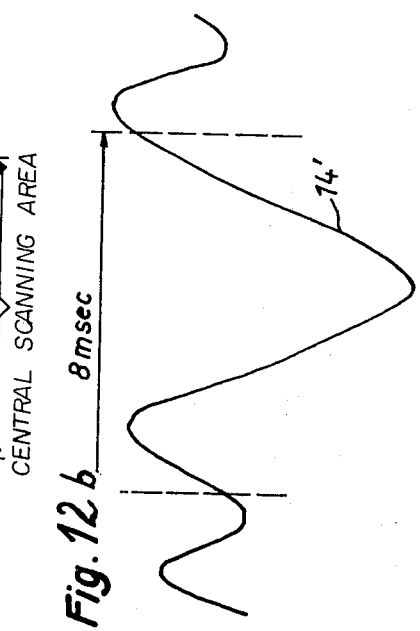
Fig. 12.b
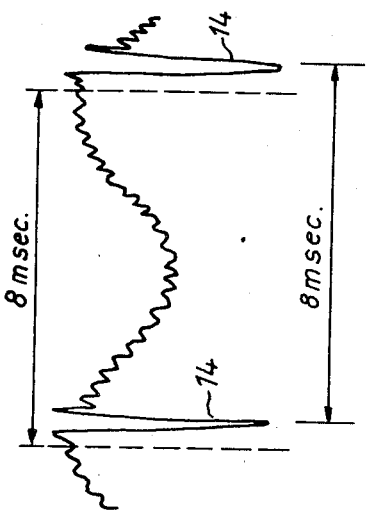
Fig. 12.a

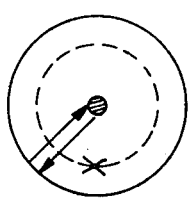
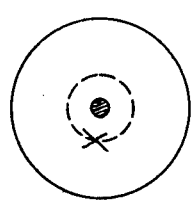
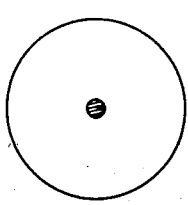
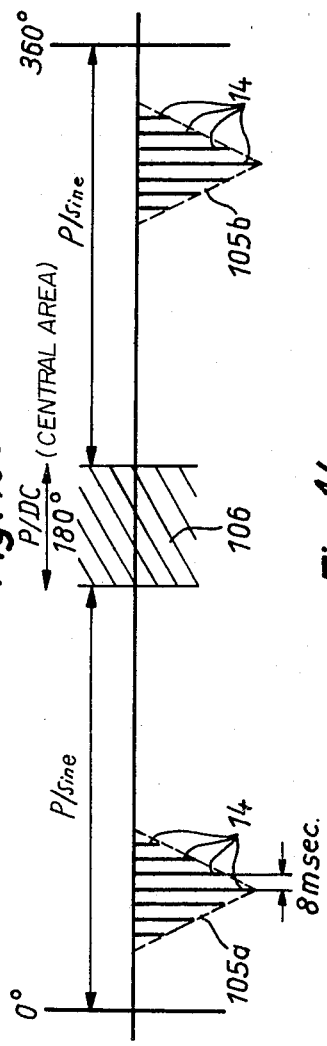
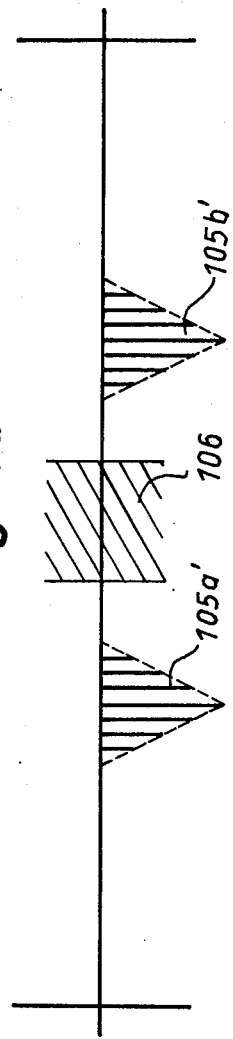
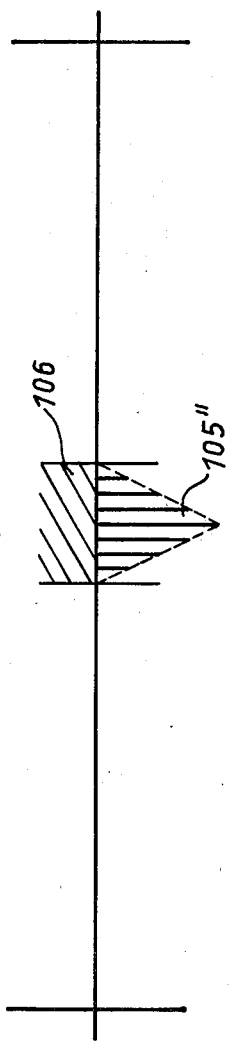

METHOD AND APPARATUS FOR PERFORMING A COMPARISON OF GIVEN PATTERNS, IN PARTICULAR FINGERPRINTS

STATE OF THE ART

The invention is based on a method and apparatus for performing a comparison of given patterns, more particularly fingerprints.

It is known from U.S. Pat. No. 3,947,128 to compare the fingerprint of a person obtained directly at that time with a recorded representation of this fingerprint which may be located, for instance, on an identification document, a credit card, some other information carrier, or the like.

In order to perform this comparison, an image of the fingerprint is produced by placing the finger of the person in question upon a prism, and this copy is brought by optical means into coincidence with the recorded fingerprint, which with the information carrier carrying it is located in a card slot of the comparison device. In order to bring about congruence, the beam of light carrying the image of the finger print is subjected to a search movement, with the aid of a first trapezoid prism and next with the aid of two prismatic wedge forms, which execute a rotary movement about an axis. When there is identity of the fingerprint image with the recorded representation, after photoelectric conversion of the beam of light effecting the comparison, a particular characteristic results in the alternating-current output variable of the photo detector, which can be evaluated. This identity characteristic may be a maximum or a minimum output value, depending upon whether negative or positive fingerprint characteristics are being compared with one another. Indications as to the effective evaluation of the detector output signal obtained or to the precise course of such signals are not furnished.

It is therefore the object of the present invention to create a method and an apparatus which are capable of detecting and interpreting the optically obtained comparison values of the pattern comparison, after their conversion into an electrical variable, in a reliable and highly precise manner and in such a way that they cannot be falsified, so that a reliable assessment can be made as to the identity content of a fingerprint or master symbol compared with a recorded representation. In this respect, it is also desirable for the test appliance at the same time to perform monitoring of the card itself, which must exhibit particular markings, lines, or what will below be called simply master symbols in such a form that they cannot be counterfeited, so that the identification chain of card system/fingerprint carrier is a closed system. It is also desirable for the result of the identification monitoring to have the highest possible reliability, while the operation is performed rapidly.

ADVANTAGES OF THE INVENTION

The invention attains this object with the characteristics of the first method claim and of the first apparatus claim and has the advantage that even in the case of similar fingerprints the precision of the identity assessment is particularly great and reliable, so that errors can substantially be precluded. In an advantageous manner, the invention can be used for evaluating one or more different criteria for testing or monitoring, and the identity of the fingerprint to be monitored with the recorded representation is assumed to be certain only after a total output signal has exceeded a given level, this level being adjustable. As a result of the characteristics disclosed in the dependent claims, advantageous modifications of and improvements to the invention can be attained.

It is therefore advantageous that in addition to the optical search movement in the X-Y coordinate plane, in which the recorded representation is located, the recorded representation itself can also be subjected in addition to a mechanical displacement movement, preferably simultaneously with the optical search movement, in order to attain congruence of the images. Thus, even if the finger which has the fingerprint to be monitored is placed somewhat obliquely in the finger guide, an optimal assessment as to the identity content can still be made. Further subordinate control loops are present for the purpose of maintaining lamp brightness or amplifying the system to predetermined levels.

It is particularly advantageous that it is possible to perform an optical distortion of the form of the image of the pattern to be compared, with an identical distortion being simultaneously performed in preparing the recorded representation of this pattern. As a result, counterfeiting or falsification is reliably precluded, because recorded representations are not compared with their copies; instead, from the outset, distorted representations are compared with correspondingly distorted copies which have been obtained directly prior to the comparison.

It is also advantageous that the monitoring of both the fingerprint and the comparison of the master symbol, which is also disposed on the card, can be undertaken in a common test appliance; then at least in part, components of the one system can also be utilized by the other system, and the same also applies to the common evaluation logic circuitry.

It is furthermore advantageous that an acceleration of the test process can be attained whenever a first test is made as to the agreement with the master symbol and the remaining test process is then terminated if no agreement is found here at the outset. If there is a "GOOD" assessment in the monitoring of the master symbol, then immediately, for instance within one-half second, the monitoring as to the identity of the pattern is performed, and a reversal switch which is subsequent to the two photoelectric detectors then applies the input of the electronic evaluation circuit to the particular output carrying a signal at that time. Because during each complete scanning cycle performed by a moving scanner, a region is scanned twice in which identification pulses appear in the course of the electrical output signal, an additional moving scanner which lends the card holder an incremental or step-wise rotational search motion switches further each time one-half scanning cycle has elasped, so that the pattern comparison can be performed with twice the test speed.

Depending on the rotary speed of the moving scanner, identification pulses result which are fixed in terms of the time intervals between them, and these time intervals between them may represent an additional test criterion. Means are also provided which avoid imprecise monitoring in the central region of the scanning plane or are so embodied that processing can also be performed in the rim areas where there is a higher scanning speed.

Finally, the invention also proposes the embodiment of a scanner in which differing scanning speeds are avoided.

Alternatively, however, it may also be a particular advantage for the monitoring of the identity of the carrier fingerprint with the card fingerprint on the one hand and the identity of the card master symbol with the master symbol stored in memory in the appliance on the other hand, which are performed in a common test appliance, also to be performed by using the common means of only a single optic bench and one electronic evaluation system.

As a result of the manner of disposition first of the fingerprint and second of the master symbol so that they are in optical congruence at the same location on the card or identification document, there is particularly high security against falsification or counterfeiting, because the lines based on the one hand on the fingerprint and on the other hand on the master symbol can no longer be individually isolated and accordingly cannot be detected, even at great effort or expense.

This embodiment of the test appliance is furthermore so designed, in an advantageous manner, that first the entire test cycle is performed, that is, a test is first made as to the identity of the fingerprint and the master symbol, before either an error indication or the "GOOD" indication is issued. Accordingly, someone intending counterfeit use of the card or other information carrier will not obtain any assessment as to which criterion (fingerprint or master symbol or both) has been made the basis of rejection by the test appliance in performing the test.

There is another possibility for counterfeiting, which is that in order to obtain identification pulses of sufficient magnitude the finger may be moved very rapidly on the measuring prism, for instance being rapidly lifted and then applied on the prism once again. This opportunity for counterfeiting is confronted by means of the evaluation of a signal of a feedback line which regulates the lamp brightness to a constant brightness for evaluation purposes.

DRAWING

One exemplary embodiment of the invention is shown in the drawings and will be described in detail below.

FIGS. 2a and 2b illustrate the mode of operation of a rotating wedge system schematically, as well as the spiral shifting of the fingerprint copy in one plane which results from this search motion;

FIG. 3 shows one possible curve form for the detector output signal in the case of identity of the image and of the recorded representation of the fingerprint;

FIG. 4 is a schematic block diagram of an electronic evaluation circuit which assures a multiplicity of test critera;

FIG. 5 is one exemplary embodiment of an electrical circuit in the form of a block diagram for obtaining the fundamental sine wave oscillation signal contained in the detector signal;

FIGS. 6a and 6b are block diagrams of circuits for performing comparion of a negative peak pulse, occuring upon identity of the image and of the recorded representation, with electrical signal forms likewise contained in the detector signal;

FIG. 7 shows one form of embodiment of a block diagram for a further test criterion;

FIG. 8 shows one form of embodiment of a block circuit diagram for a supplementary test criterion;

Figure 10:
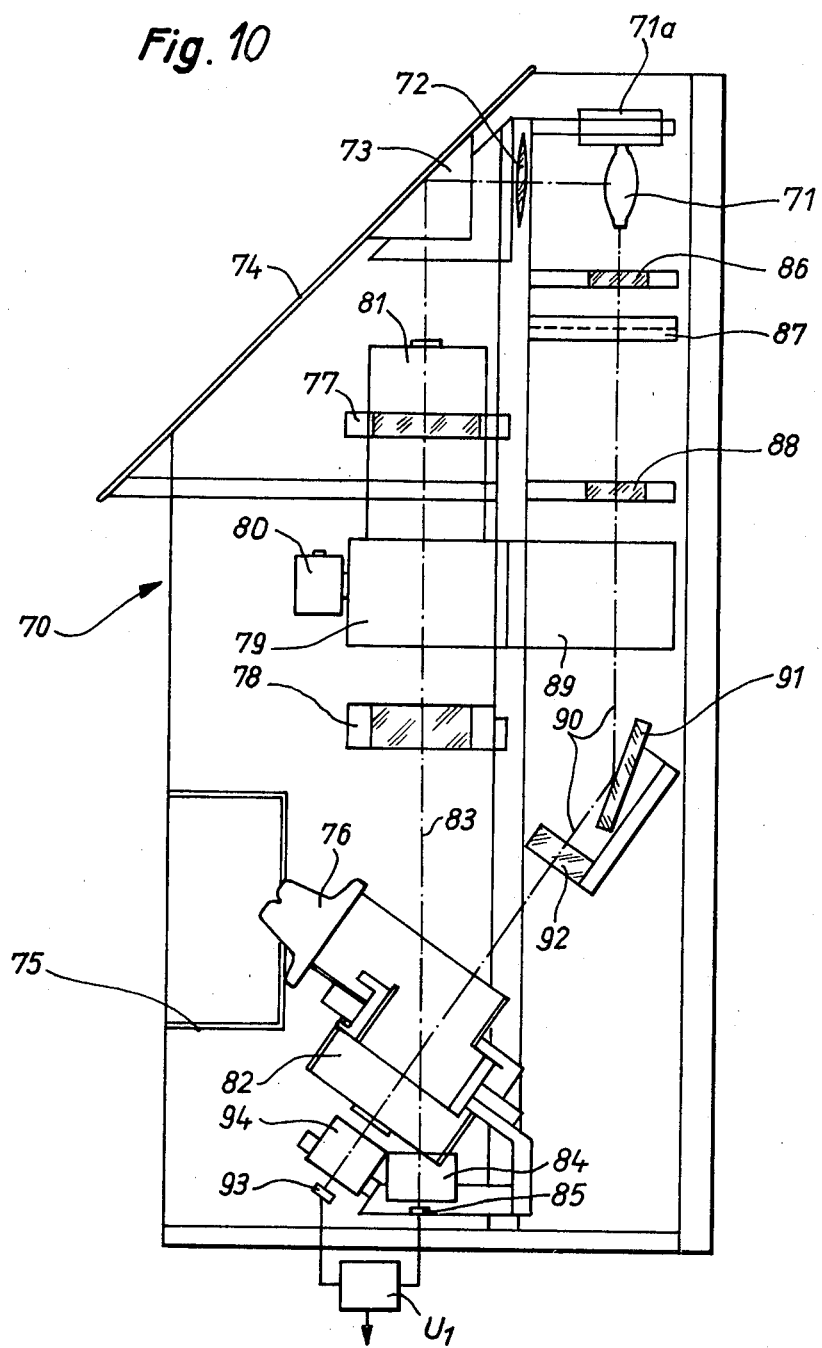
Figure 16:
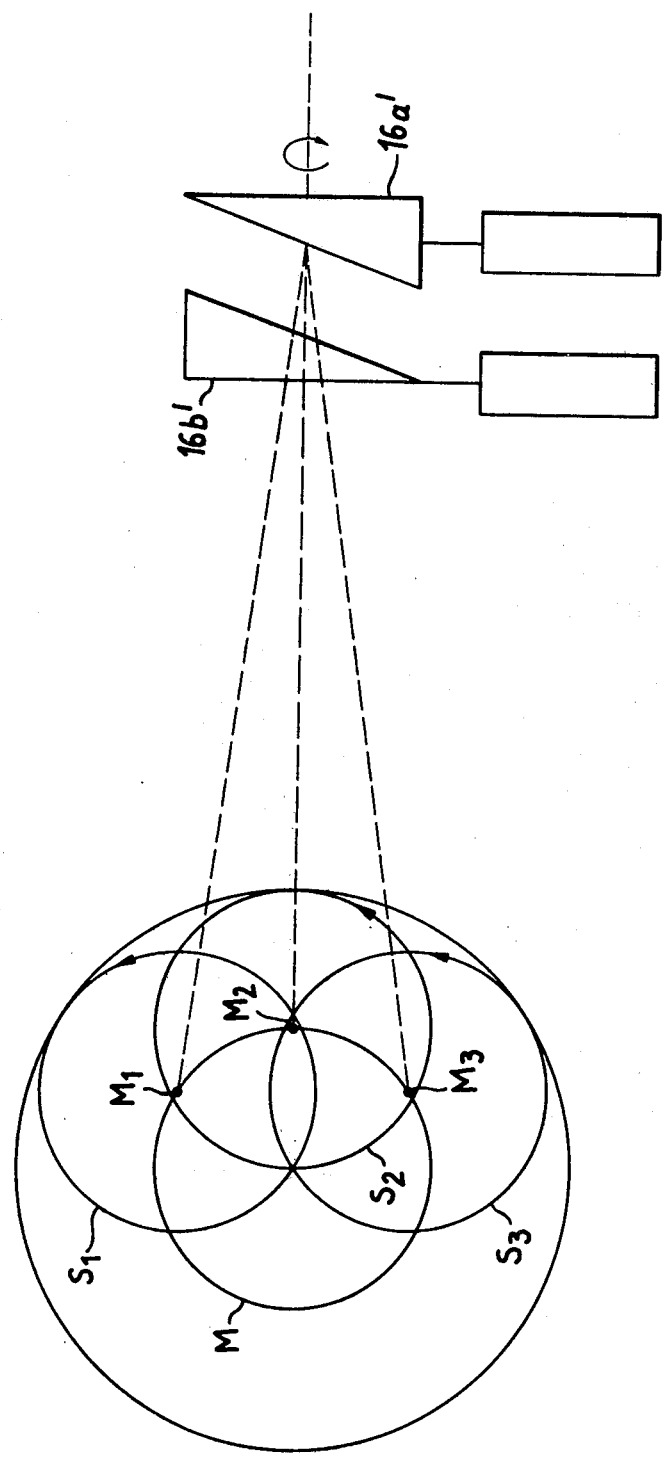
Figure 17:
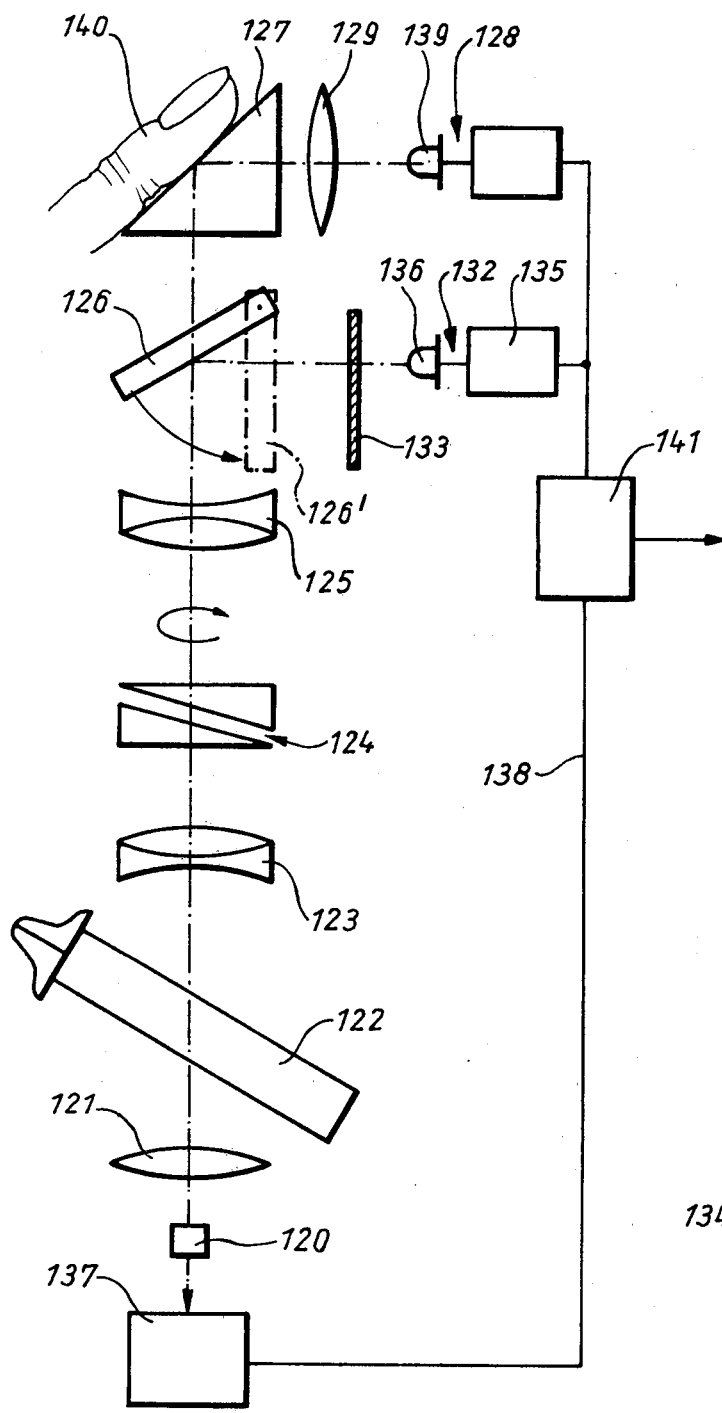
Figure 18:
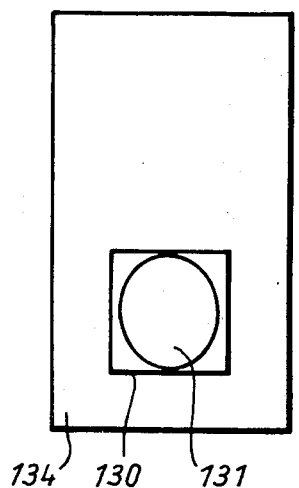

FIG. 9 in the form of a block circuit diagram, shows one possible form of embodiment of a decision circuit combining the output signals of the monitoring blocks;

FIG. 10 is a schematic lateral view of a further possible form of embodiment of the test appliance and of the structural association of the individual component with one another;

FIG. 11, schematically illustrates the scanner area and the effect resulting from the continuous phase displacement in the rotary motion of the wedge prisms of the scanner, in the form of diagrams;

FIGS. 12a and 12b represent curves of the output signal first in the case of scanning in the rim area of the scanning spiral and second in the central area;

FIGS. 13a and b, 14a and b, and 15a and b, in the form of diagrams and in a plan view on the scanning plane, illustrate the appearance of the identification pulse ranges in the case of scanning in the outer spiral area, the intermediate area, and the central area;

FIG. 16 shows a further preferred form of an embodiment of a moving scanner;

FIG. 17 is a schematic lateral view substantially showing the partial area represented by the optic bench of a further form of an embodiment of a test appliance, along with the structural relationship of the individual components with one another; and FIG. 18 is a plan view on a card, representing an identification document, having the optical congruence of a master symbol and fingerprint.

DESCRIPTION OF THE EXEMPLARY EMBODIMENTS

The fundamental concept of the present invention is to compare a pattern, obtained at a given instant as a result of an action performed directly at that time, with a recorded pattern. Primarily, in accordance with the preferred exemplary embodiment of the present invention, the object is to compare the pattern of a fingerprint obtained at this instant with a fingerprint existing as a recorded representation. A comparison is made by an electrical signal which is similar to an alternating voltage which is evaluated with the aid of at least one criterion but preferably with the aid of a greater number of test criteria. The comparison is made in such a way that when a decision is subsequently made as to the agreement or nonagreement of the pattern obtained directly prior thereto with the recorded pattern, the probability as to the particular decision approaches certainty. The recorded pattern, for instance the recorded fingerprint, is located on a base which under the action of electromagnetic radiation, such as visible light or infrared light or the like, produces a radiation image which has been modified by the lines of the fingerprint; in other words, this image is no longer uniform. This base is preferably transparent, and the recorded fingerprint lines are recognizable as more or less dark areas. It is also possible to embody the fingerprint lines as bright paths on a dark background. The base itself, in turn, may be a component of some desired document or identification paper, such as a credit card, some other information carrier, a coded card, a driver's license or some other identification document, passport, personal identity card, check-cashing card, or the like; it may also be part of so-called key cards intended to be inserted in given openings to provide access to buildings or the like to authorized persons.

As a result of this additional means of monitoring provided by the invention, each person having a base carrier of this kind is able to prove that he is the authorized person to use this carrier, because upon using the carrier evidence is provided that the fingerprint located on this carrier coincides with the fingerprint with which it is compared.

This base or information carrier will be described below exclusively as a card which at a given location also includes a recorded representation of the fingerprint of the person carrying the card and thus authorized to use it. As a result, it is possible to carry out a multiplicity of activities, business decisions, and purchases with the aid of credit cards and the like with absolute security against counterfeiting, and it is also possible to preclude access to buildings to all but those persons authorized to enter them.

The mechanical structure of the system according to the invention will be described below, and then the electronic evaluation circuits and further advantageous embodiments of the invention will be discussed subsequently.

The Mechanical Structure

The mechanical components are disposed and embodied in such a way that they compare an image of a fingerprint obtained directly prior thereto, for instance by placing a finger 4 upon a prism 5, and superimpose it upon the recorded representation 1 of a fingerprint, which is located on an information carrier or card 2, in the form of a transparent copy with blackened lines, for instance, the card 2 having been inserted into a card holder 3.

For performing this comparison, light falls from a lamp 6 by way of a lens system 6a, embodied in arbitrary fashion, first upon a mirror 7 and from there upon the prism 5; at the inner prism face 5a of the prism 5, there is total reflection, but only with respect to those areas which are not in direct contact with the ridges of the fingerprint. In other words, the beam of light exiting from the prism 5 carries an image of the fingerprint obtained in this manner. This fingerprint image, by means of a further lens system 8, is fed into a structural component which imparts movement in the X-Y coordinate plane to the fingerprint copy, in fact a searching movement, so that this structural component can be described as a moving searcher or scanner 9, because as a result of this movement which is imparted to the fingerprint image by the moving scanner 9, the copy is shifted continuously and, as will be discussed in more detail below in connection with the structure with the moving scanner 9, this shifting is effected in the form of a spiral in the X-Y coordinate plane in which the recorded representation 1 of the fingerprint is located. A further lens system 10 is located between the moving scanner 9 and the copy or recorded representation 1, with the beam of light passing through the transparent region of card 2 and thus through the recorded representation of the fingerprint 1 being bundled together by a further lens system 11 and reflected onto a light-sensitive element 12, preferably a photo diode, a detector or the like. In this connection it will be understood that within the scope of the invention, this structure may include not only mechanical elements but also alternative elements, for instance solely irradiating the recorded representation 1 with the image of the fingerprint and evaluating the reflected beam; the use of other suitable radiation means serving the purpose of scanning; and electromagnetic radiation in general, thus encompassing not only light at the ends of the visible light spectrum but also infrared light or ultraviolet light.

In any case, an electrical current is produced at the output of the photo detector 12 which is proportional to the varying light energy falling upon it, or after conversion a corresponding proportional electrical voltage, which has the character of alternating current and is evaluated by a subsequent, electronic device 13 in such a manner that the result is the identification of the fingerprint imprinted on the prism 5 correspondingly with the fingerprint recorded on the card 2 with a degree of probability such that errors are excluded.

The structure and mode of operation of the moving scanner 9 are as follows: the moving scanner 9 shifts the copy of the fingerprint continuously in the X-Y coordinate plane of the recorded representation 1, so that at a given instant—which is not, however, foreseeable—the two fingerprints, that is, the recorded fingerprint and the fingerprint obtained immediately previously by means of measurement, must also arrive at a point of absolute, but very brief, coincidence if they are identical.

It has already been noted above that the fingerprint ridges, in producing the fingerprint copy, do not cause reflection at the prism, so that a negative copy is produced behind the prism with areas where light energy is absent in the X-Y coordinate plane wherever the ridges of the fingerprint were located during measurement.

In the case of identical fingerprints in both image and recorded form, as long as these images are not exactly coincident there is a kind of average light stream. This average light stream, after conversion into an electrical variable, causes the course of oscillation shown in FIG. 3, comprising an oscillation having approximately a sine-wave form and low frequency and a superimposed oscillation of higher frequency with a comparitively smaller amplitude. At the instant of identical coincidence, however, the course of the lines in the fingerprint in the recorded representation blank out light precisely at those locations where light was already present only to a limited extent as a result of the weaker reflection at the prism 5, or the locations are blanked out which during the course of prism reflection underwent total reflection. This latter case occurs when the depressions in the finger lines have been blackened during recording, that is, when the recorded image is negative. This completely identical coincidence causes a brief drop in the current of light and a corresponding, noticably negative pulse 14 in the course of the curve of FIG. 3, this negative pulse 14 being bounded at either side, as has been ascertained, by two positive pulses 15a, 15b which are likewise noticably differentiated from the wave form of the other pulses.

In order to attain this identity of coincidence by means of the moving scanner 9, the moving scanner has two prism wedges 16a, 16b which rotate about their own axis in accordance with the arrows at a comparatively high speed; furthermore, there is a slight difference in their speeds. FIG. 2a illustrates what is meant by this. If both wedges 16a, 16b are located in the position indicated in FIG. 2a by a solid line, then a stream of light 17 passed through the wedges undergoes a maximum downward deflection by means of both wedge prisms. The stream of light then, at 18a, strikes an imaginary screen located in the X-Y coordinate plane. If both wedge prisms, as indicated by broken lines, are disposed during rapid rotation with their bottom faces upward and rotating in the same direction, then the stream of light, as may be easily understood, undergoes a maximum upward deflection and strikes the screen at 18b.

As a result of the slightly different speeds of rotation of the two wedge prisms 16a, 16b, however, there are shifts in the uniformity of rotational direction of the wedge prism positions, in such a manner that at a given instant the position of a wedge prism 16a indicated by solid lines coincides with the position of a wedge prism 16b indicated by broken lines. As a result, the deflection of the stream of light caused by one wedge is eliminated again by the other wedge, and the stream of light strikes the face of the screen at 18c. It will be appreciated that the deflection has an overall spiral course, as is indicated by the spiral path 19 in FIG. 2b, and accordingly the image of the fingerprint is located at predetermined times and at predetermined locations within a given portion 20 of the X-Y coordinate plane; however, it is located at each location at least once during the course of one complete rotation of the rotating wedge prisms, until a new position in the same direction has been attained. It will be appreciated that once during the course of one such cycle, a complete identity of coincidence must be attained with the recorded representation 1 of the fingerprint located in the X-Y coordinate plane. At this instant, the sharp negative pulse 14 appears in the course of the curve shown in FIG. 3. In FIG. 2b, various possible positions of the fingerprint copy in the X-Y coordinate plane are indicated by reference numerals 21a, 21b and 21c.

The Identification of the Fingerprint and the Electronic Circuitry

It has been mentioned above that a distinct pulse, which in the illustrated exemplary embodiment is produced as a negative pulse because of the selected light and dark field distribution of the raised and depressed portions of the fingerprint, is always produced whenever in the course of the search process identity of coincidence occurs between the recorded representation and the image of the fingerprint. In FIG. 3, it is shown that this distinct pulse, which will also be called the identification pulse 14 below, is accompanied by at least two further phenomena in the course of the obtained electrical variable, that is, the so-called detector signal. This detector signal is produced (see FIG. 4) after the conversion of the beam of light at the photo detector or a suitable photo diode 12 and after amplification at the amplifier 22. The phenomena accompanying the identification pulse are, first, a fundamental oscillation having a slight but not predictable frequency and, second, a highfrequency interference oscillation, which is superimposed on the fundamental oscillation and at least in part masks the identification pulse 14, and most likely also masks the positive pulse peaks 15a, 15b which accompany this identification pulse 14.

The following evaluation for the purpose of identification is directed to the examination of the identification pulse 14, its appearance in time and its magnitude, with respect to the other oscillation phenomena. In so doing, at least one criterion for examination is used in accordance with a further characteristic of the present invention, and preferably several examination criteria are used. In FIG. 4, the blocks connected with the output of the amplifier 22, each representing examination criteria, are given reference numerals 23–28, and the circuit which combines the result of the individual blocks and assesses them is given reference numeral 30.

In the following discussion, some of the examination criteria preferably applied in the present invention are explained in terms of the identification pulse; the order in which these are discussed, however, does not necessarily, relate directly to the significance of the assessment of these criteria.

(a) A first examination criterion is the detection of the so-called percentage-wise correlation. That is, there is a kind of percentage-wise amplitude determination of the identification pulse 14 in terms of the fundamental oscillation having a flow amplitude, in which the identification pulse 14 is embedded; in other words, it is a matter of determining the distance separating the identification pulse 14, which appears in negative form here, from the fundamental oscillation at the point where the identification pulse itself has been created. It will be seen from the course of the detector signal in FIG. 3 that the total signal does have regions which are disposed still more negatively than the negative identification pulse itself, so that specialized means are required for discrimination purposes, and these means will be discussed in further detail below. The ratio of the amplitude of the identification pulse 14 to the amplitude of the fundamental oscillation signal which is given at this same point is an indicator of the dimension of the percentage-wise correlation. With respect to an accurately ascertainable threshold value, this dimension is in any case an indication as to the identity existing between the recorded representation and an image of the fingerprint.

(b) A further indication of the presence of identity between the image and the recorded representation is attained by means of the ratio between the largest positive pulse 15a, 15b accompaning each negative identification pulse 14 which appears, and the high-frequency fundamental oscillation interference signal. The greater the differentiation between the positive pulse and the average of the high-frequency oscillation, the more reliably it can be determined that there is a positive pulse accompanying a negative identification pulse 14. This criterion is represented in FIG. 4 by the symbol $+P/A$ ($+$peak/average signal).

(c) In addition to the evaluation of the percentage-wise correlation of the negative identification pulse 14 to the amplitude of the (slow) fundamental oscillation, the negative identification pulse may also be placed in relationship with the average value of the high-frequency interference oscillation; here again, a sufficiently distinct difference between the identification signal and the high-frequency interference signal is an indication as to the identity existing between the image and the recorded representation. This criterion is indicated in FIG. 4 in block 25 by the symbol $-P/A$ ($-$peak/average signal).

(d) A further criterion which may be applied for assessment purposes in making a final test of identity is represented in block 26 of FIG. 4, where the ratio of the identification pulse to the direct-current signal or in general to the required amplification is ascertained; this is indicated in FIG. 4 by the symbol $-P/DC$ ($-$peak/DC signal). Forming such a ratio is useful, in any case as one of the criteria used for the purpose of identification, because as a result of amplification to an arbitrarily great extent, negative pulses can be formed having amplitudes such that they could enter into the boundary range of genuine identification pulse amplitudes. The criterion $-P/DC$ of block 26 assures that no errors in measurement can be caused by an excessive amplification.

(e) A characteristic in the test of identification which should be mentioned as well in this connection is that the time interval produced between two identification pulses 14 and the curve shown in FIG. 3 is detected and assessed; that is, the period T, which is a variable which can be derived from the parameters of the appliance and in any case can be derived in terms of this magnitude from the appliance, the drive speeds of the scanner, and the like, is detected and assessed.

Accordingly, if it can be ascertained that the negative identification pulse 14, in the course of comparison of the fingerprint copy with the recorded representation, appears within given intervals, and only in approximately identical time intervals T, then this pulse is a genuine identification pulse, and the evaluation is continued in the positive direction. From the discussion above relating to the searching process, it is understood that the image of the fingerprint will be identically coincident with the recorded representation on repeated occasions within a short period of time, because the area 20 which is scanned during the course of the spiral movement of the image is naturally traversed repeatedly during the course of an identification.

The invention does not preclude the application of further criteria for assessment in making a final judgment; these criteria finally also relate to characteristics identifying the position of the negative identification pulse 14 with respect to the rest of the signal spectrum. Block 28 in FIG. 4 stands in representative fashion for these further criteria, which will not be discussed in further detail in order to save time and space.

The Electronic Detail Circuits

With respect to FIG. 4, it has already been noted that the detector signal whose course is shown in FIG. 3 appears at the output of the amplifier 22, this detector signal being intended for evaluation for the purpose of identification.

First, with the aid of the circuit shown in FIG. 5, a fundamental sine wave oscillation signal SG is formed from the detector signal DS delivered to the input 31 of a low-pass filter 32. This fundamental sine wave oscillation signal SG now has only the fundamental oscillation component of the detector signal DS as shown in FIG. 3, without the high-frequency interference component and without the peaks 14, 15a, 15b. However, this fundamental sine wave oscillation signal SG must be in a phase-correct relationship with the detector signal and therefore the low-pass filter 32 is followed by a phase compensation circuit 33, which reesstablishes the phase-correct relationship of the sine wave fundamental oscillation signal SG to the fundamental oscillation component in the detector signal DS which had been lost as a result of the low-pass filter.

The fundamental oscillation signal SG is used to produce the percentage-wise correlation signal, as shown in FIG. 6a, that is, a correlation signal which will be indicated below with the symbol $-P/SG$. By means of delivering the fundamental oscillation signal SG to one input of a subtracting amplifier 34 and delivering the detector signal DS to the other input, specifically the negative input of the same amplifier, a negative reference signal is obtained at the output of the amplifier which is free of fundamental oscillation and therefore exhibits solely the primary pulses and the high-frequency interference signal. In order to place this reference signal at the output of the amplifier 34 into a relationship with the fundamental oscillation signal SG, the fundamental oscillation signal SG is once again delivered to an input of a subsequent analog divider circuit 35, whose other input is connected with the amplifier 34. Then, as may be appreciated, a pulse is produced at the output of the divider circuit 35 which, after intermediate amplification at 36 if necessary, is delivered to a peak detector 37, at the output of which the desired correlation signal $-P/SG$ is produced.

The same reference signal formed at the output of the amplifier 34 is delivered, corresponding to the exemplary embodiment of FIG. 6b, to the first input of a further analog divider circuit 38. From the small sketch shown at the output of the amplifier 34 relating to this reference signal, it will be appreciated that this signal still contains the high-frequency oscillation component which will be designated below as the harmonic frequency content, so that it is possible to generate from this signal the criterion $-P/A$ as the ratio of the negative peak value to the harmonic oscillation. After the parallel delivery of the reference signal to a low-pass filter 39, a negative average harmonic frequency signal is produced at the output of this low-pass filter 39, and the desired output signal $-P/A$ is produced after the peak detector 41, again provided here, after the division of the two signals of a divider circuit and after the possible amplification performed at 40.

Fundamentally the same circuit is shown in FIG. 7 for obtaining the ratio of the positive peak signal to the average value of the harmonic oscillation ($+P/A$), but here, however, the subtracting amplifier 42, at the input, now receives the detector signal DS as its positive input and the negative fundamental oscillation signal at its other, negative input. The result at the output of the amplifier 42 is then a positive reference signal, and correspondingly at the output of the low-pass filter 39' there is a positive average value signal of the harmonic oscillation content, so that the $+P/A$ signal is produced after the ratio has been formed at the analog divider circuit 38' and after amplification at 40' following the peak detector 41. The evaluation of these signals will be discussed in greater detail below.

A circuit which is similar in comparison is produced in accordance with FIG. 8, in order to generate the $-P/DC$ signal, where the detector signal DS is delivered parallel to the input of a high-pass filter 43 and a low-pass filter 44. A direct voltage signal DC is produced at the output of the low-pass filter 44, and this signal can also be considered as a standard for the amplification, so that after the ratio is formed at a further divider circuit 45, and after amplification at 46b and peak value detection at 47a, the output signal $-P/DC$ is obtained which indicates the ratio of the negative identity pulse to the direct voltage level.

Finally, the time interval signal TA, obtained by means of the block 27, can be generated for instance with the aid of a time delay circuit, such as a monoflop, by triggering the monoflop variously with the peak pulse at one of the inputs of the peak detectors 37, 41, 41' and setting the delay time until the monoflop returns to its normal position such that the next identification pulse, as a peak value, triggers the monoflop once again until it returns back to its original state. The fact that the monoflop remains in its metastable state is then to be considered as a "GOOD" signal in terms of determining the time interval. In other words, the peak pulse recurs repeatedly within the time period T dictated by the system. Naturally, other means of attaining this end are also possible with the aid of time delay members of the most various kind.

The peak detectors 37, 41, 41' are embodied such that at their outputs a signal results which has a relatively long duration and corresponds to the maximum amplitude of the peak pulse delivered to the input, so that the height of the output signal of the peak detectors is a standard for the assessment made by the various circuitry as to the ratio of the input variables which have been compared with one another.

Thus two signals are delivered to the logical decision circuit 44 from the card holder 3 (see FIG. 1), namely a first KI signal, which indicates that the card 2 carrying the recorded repesentation of the fingerprint has been completely inserted into the card holder, or alternatively a KT signal indicating that the card has been inserted only partially and would therefore causing blocking or rejection. A further signal proceeds from a finger guide 47, not shown in FIG. 1, to the logical decision circuit 46, and this signal indicates that the finger guide has been pressed down in the proper manner and accordingly that a finger 4 is indeed located adjacent to the prism 5.

Finally, a light level recognition device 48 is present, which generates a first signal LL, indicating that the level of the light is satisfactory, as well as a second signal FP indicating that the finger is in contact with the prism 5. After all of these additional input signals have been adjudged as good, the logical decision circuit 46 generates information at three indicator devices 49, 50, 51 relating to the position of the inserted finger. In the case of the indicator device 49, that is, information is provided as to whether the finger should be withdrawn again or should be placed back on the prism again. In the case of the indicator device 50, information is given which can produce a "GOOD" indication or an indication that the identification process has had a negative result and should thus be rejected. Finally, the indicator device 51 indicates whether an incorrect manipulation of the system as a whole has been ascertained. The logical decision circuit 46 derives the states resulting at indicator devices 49 and 51 primarily from the input signals of elements 3, 47, 48.

Further Realizations of the Invention

Associated with the logical decision circuit is a further time circuit 46a, which synchronizes the synchronized elapse of time of the individual events in the identification system, and its output pulses can also be used to trigger the system associated with the sample and hold circuit already mentioned above. This system includes a comparator 60, whose two inputs 60a, 60b are connected respectively with the input and output of the sample and hold circuit 49a, a driver circuit 61 following the comparator 60, and a stepping motor 62. The object of this system is the initial adjustment of the geometrically optimal position of the fingerprint copy, obtained from the finger placed upon the prism 5, with respect to the recorded representation 1 by mechanical follow-up control means. It is true that, as noted, a finger guide 47 for the finger 4 is provided; however, the possibility cannot be excluded that the finger may under some circumstances be placed somewhat obliquely or in a twisted manner. Since the searching process is intended to determine identical congruence with the aid of the moving scanner 9, then if the fingerprint copy is positioned even only slightly obliquely relative to the recorded representation, or vice versa, this situation cannot be completely compensated for.

Figure 1:
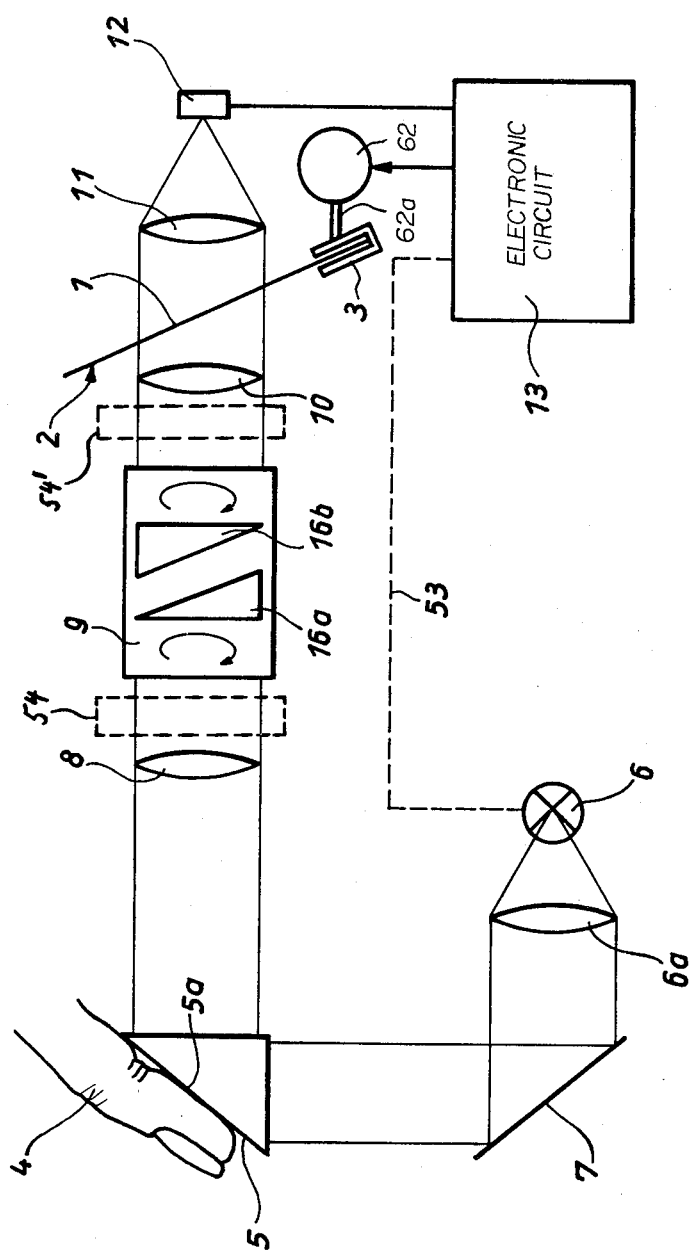
FIG. 1 is a schematic representation of the fundamental form of the opto-mechanical structure of the system for fingerprint comparison according to the invention.

Accordingly, the output shaft 62a of the stepping motor 62 is connected to the card holder 3 in FIG. 1 mechanically in such a way that a gradual follow-up can be performed by means of this stepping motor; that is, usually a slight rotary movement of the recorded representation 1 is made in order to optimize the geometric relative position of the copy and of the recorded representation to one another. It will be understood, however, that a follow-up circuit of this kind may also enable other arbitrary movements, intended to make it possible to optimize the relative position of the copy and of the recorded representation to one another, possibly using further stepping motors. The function of this supplementary circuit is then as follows:

At the beginning of measurement a combined preliminary identification pulse of predetermined amplitude is present at the output of the summing amplifier 63. After comparison with a given safety threshold at comparator 65, this amplitude either causes the delivery of a valid identification pulse to the logical decision circuit 46, or does not do so. At the same time as this first preliminary identification pulse appears at the output of the summing amplifier 63 and/or at the same time as the finger 4 is placed upon the prism 5 with the aid of the finger guide 47, the stepping motor mechanism is set into operation, and at first there is a very slight rotary movement of the stepping motor 62 in some arbitrary direction. As may be understood, this results at the output of the summing amplifier 63 in an identification pulse of varying dimension; that is, the pulse is either smaller than the preliminary identification pulse if this rotation has attained a lesser approximation to the ideal identity of congruence, or the amplitude of this preliminary identification pulse will become greater because the geometric positions have moved in the direction of optimization. In this case, a comparator 60, at whose input 60b the pulse resulting from the foregoing measurement process is present and to whose input 60a the new preliminary identification pulse has been delivered, causes a further adjusting movement of the card holder 3 by means of the stepping motor 62 in the direction in which the initial movement was made, in order to attain further optimization. In the other case, that is, when the result has proved to be worse, the rotary movement is effected in the opposite direction. It will be understood that thus, given an appropriately rapid functioning of this follow-up control, an optimal position between the copy and the recorded representation can be attained very rapidly, so that even if the contact between the finger 4 and prism 5 has been unfavorable, thoughtless, or not sufficiently careful, still an identification pulse can be realized at the output of the comparator 65 whose size is sufficient to overcome the safety level of the circuit 64 as a threshold. It will be understood that this safety level of the circuit 64 will be set so sufficiently high that all the pulse peaks which may be caused by fingerprint comparison resulting in nonidentity will be disposed reliably below the threshold. In this case, even the mechanical follow-up control for the card holder 3 cannot cause a noticeable improvement in the result, precisely because the fingerprints to be compared with one another are not identical. However, in the case of identity, an optimization results which further emphasizes the agreement and identity between the two images. A further advantage of the present invention is that various light conditions, which may result from various degrees of darkening in the recorded area of the card 2, from variation in coloring of the finger 4 placed on the prism, or the like, are taken into consideration; that is, a closed-loop control circuit is provided which regulates the lamp brightness by way of a connecting line 53 between the electronic evaluation circuit 13 and the lamp 6. If, for example, the signal level resulting at the output of the photo detector 12 is excessively weak overall, then this is primarily the result of excessive weakening of the beam of light performing the evaluation and comparison, and the lamp 6 is accordingly regulated as to its brightness. Furthermore, a threshold circuit performing comparison may be provided at the output of the amplifier 22, appropriately regulating the amplification in the case of an excessively low electrical level of the course of the signal to be evaluated. This follow-up regulation of the lamp brightness and/or of the degree of amplification of the amplifier 22, for instance, may, however, also affect the signal criterion $-P/DC$, so that it is recommended that the degree of amplification at a particular time and/or the follow-up control of the lamp brightness be taken into consideration when forming the ratio for the partial criterion $-P/DC$.

A further embodiment of the invention is based on the following consideration. As a result of the identification test assured by the invention, it is true that the agreement of the fingerprint of the owner of the card with the recorded fingerprint on the card 2 is correct, and accordingly that this owner is the sole authorized carrier of the card. However, it cannot be assured with certainty that this card will obtain access to rooms, for example, belonging to some business which also uses a fingerprint comparison system of this kind, but to which the owner of the card himself does not belong, or that credit cards may be counterfeited or used in some other context, and so forth. In such cases, additional criteria must be placed on the card for the sake of distinguishing between card owners, such as magnetic coding, infrared coding, or the like. The invention, however, suggests a particularly elegant way out of this dilemma, because a supplementary optical coding is performed which cannot possibly be counterfeited.

In any case, of course it is necessary when first producing the recorded representation of the fingerprint for the person who will later use the card to be present, and for this recording to be made, for instance, by disposing a photographic appliance in the place of the card 2 carrying the recorded representation. That is, an approximately identical arrangement may be used to that shown in FIG. 1, with the exception of the search movement caused by the scanner 9. While the recorded representation is being made, a device may be introduced into the path of the beam, at reference numeral 54 or 54', this device generally functioning as an optical encoder, for instance enlarging the beams or breaking the beams at various points, distorting them, or the like; in that case, the representation of the fingerprint will then be correspondingly distorted from the outset. It will be understood then that the optical encoder 54 will be used in the absolutely identical form in all the appliances of one firm or one customer, credit card issuer, or the like, this encoder later being used to perform the comparison between the copy and the recorded representation of the fingerprint.

Since the possibilities of optical encoding are practically infinite, it is also possible to equip every firm operating with the system according the invention—that is, every association, every issuer of credit cards, every bank, and the like—with appliances all of which have an identical optical encoding and accordingly perfectly define the circle of those participating by means of this "code word", which cannot be counterfeited and which is produced by optical distortion, so that this circle will exclude all other card owners who generally use the same fingerprint identification system.

Examples of optical encoders 54 are additional lenses in the path of the beam having an arbitrary but predetermined refractive capacity, but preferably a telescope-like device is introduced having so-called cylindrical lenses which permit a multitude of modifications and codings. However, since the identical optical encoding has already been used in the initial preparation of the recorded fingerprint itself, this additional encoding for the actual identification process is without significance, because the particular fingerprint copy prepared with the distorted representation has already been distorted in precisely the same manner.

It is also recommended to adjust the optical system or its beam path shown in FIG. 1 in such a way that the helix of the lamp 6 is located precisely in the optical axis. In other words, this helix, during the various rotation search movements performed by the prism wedges 16a, 16b of the moving scanner 9, will not undergo any optical shift in position, because the characteristics of the prism, that is the refractive capacities, do not vary geometrically precisely in the optical axis which is simultaneously the rotary axis.

A further and particularly advantageous embodiment of the present invention relates to an improvement in the quality of identification attained by the system. Without doubt, the multiple repetition of the total testing procedure permits the reduction of errors in identification on the part of the system according to the invention when there is in fact an agreement of the recorded representation with the fingerprint copy obtained by the application of the finger to the prism. The following procedure, however, makes a multiple and possibly tedious repetition superfluous, because as a result of this advantageous embodiment is it possible to increase the precision of identification practically to such an extent that the probability as to the identity or nonidentity between the recorded representation and the copy approaches complete certainty already at the first attempt.

This embodiment is based on the parallel comparison of the copy of the fingerprint immediately obtained by contact with the prism with a relatively large number of recorded representation which may be located on the card for instance. That is, a sort of multiple comparison of the copy and the recorded representation is performed.

It has already been mentioned above, in connection with the representation of FIG. 2b, that as a result of the searching movement of the scanner 9 in the X-Y plane a shifting of the copy is performed in order to attain identity of congruence with the recorded representation, which is also located in this same X-Y plane. This searching movement is as a rule spiral; however, it can also be of different forms, especially as used in this present embodiment now being discussed; for instance, it may solely scan a peripheral rim. In FIG. 2b, a relatively large number of recorded representations are shown with broken lines and given reference numeral 54; these recorded representations serve the purpose of the multiple comparison. In other words, during one complete cycle of the searching movement of the copy in the plane of the recorded representation, this copy encounters, for example, six or eight recorded representations, as a result of which the probability of the identity which can immediately be ascertained is greatly increased as a result of the coincidence between the copy and at least one of the recorded representations, this increase being of an exponential type.

This multiple scanning must not necessarily be restricted to the comparison of only a single fingerprint copy with two, six or eight or even more identical recorded representations; instead, it is also possible in an extreme case to provide as many different recorded representations as there are fingers to be compared belonging to the carrier of the card. For instance, six or ten recorded representations could be provided for six or for ten fingers, so that the carrier of the card may place one finger after another on the prism for the purpose of comparison. Naturally this increases the accuracy of identification in an extraordinary way, because in the case of a person, two fingerprints of whom are identified simultaneously, the possibility of an error is practically precluded. At the same time, this first possibility of multiple comparison can also be used in the case that one of the fingers, the recorded representation which is located on the card, may be injured or soiled and thus cannot be used for comparison purposes but other recorded fingerprint representations are also located on the card so that the identity test may be performed with other fingerprints.

In another extreme case, the element carrying the recorded representation may have the six or eight identical recorded representations already mentioned of one fingerprint, and they perform the comparison practically parallel and at the same time, this being performed in the course of a cyclical (spiral) passage.

The elvaluation electronics do not need to be significantly different, because despite the identification pulses which would then be appearing in rapid sequence (in the case that identity does exist), these pulses still appear at intervals in time, depending on the speed of scanning. If needed, the speed can be reduced to this purpose, so as to allow the electronic means sufficient time, or the electronics may be split up into parallel branches triggered in a timed multiplex manner.

In any case it is recommended to provide the necessary electronic areas in dual form so as to assure sufficiently high reliability. It will be understood that in this case of multiple scanning, an appropriate alteration in the time period monitoring should be made, because the peaks or identification pulses will appear at closer intervals.

It has already been mentioned above that it is fundamentally insignificant whether positive or negative fingerprint copies or recorded representations are compared with one another. In other words, it does not matter whether the recorded representation provides for darkening of the fingerprint depressions or darkening of the fingerprint protrusions, or whether in obtaining the copy of the fingerprint the total reflection has been directed to the fingerprint depression, as mentioned.

As a matter of fact, a further preferred exemplary embodiment of the present invention provides for the comparison of not only recorded fingerprint representations with copies obtained at that instant by means of a physical contact of the finger with the prism, but instead the system according to the invention is equally suitable for the comparison of recorded fingerprint representations with other recorded representations, in rapid, counter-controlled sequence, if needed, so that is also possible to compare, for example, a fingerprint obtained in any arbitrary manner with a multiplicity of collected fingerprint data rapidly and with high reliability. This opportunity is of particularly great significance in the field of criminal studies, because very frequently fingerprints of perpetrators of crime can be obtained and then rapidly and accurately compared with fingerprints already stored in memory with the aid of the system according to the invention. It will be understood that in this case, in order to accelerate a comparison of this kind, a transport device should be provided in the area of the plane of the recorded representation, this device delivering stored fingerprint data in rapid sequence, in a stepped sequence for instance, for the purpose of testing.

The invention therefore enables not only the immediate comparison with a finger actually physically present but also the comparison of positive or negative fingerprints with one another; that is, it is practically possible to perform a comparison of two "cards" each having recorded fingerprint representation located thereon.

(5) Further Preferred Embodiments

The characteristics and possibilities described below relate substantially to modifications and further embodiment of the fundamental system described above.

One preferred embodiment of the invention provides that the primary appliance performing the comparison simultaneously or practically simultaneously also tests whether the carrier of a card, pass, credit card, or some other identification document is authorized to use this card or has it in his possession in an authorized manner. This card, pass, credit card, or other identification document will be called simply "card" below. The system described above is substantially designed such that primarily it tests whether the fingerprint of the carrier, in the case of the monitoring of identification documents, is identical with the fingerprint stored on the card. However, if the card is simultaneously or solely used as a means for enabling access, for instance to particular rooms or buildings, then the subject of the testing is not only whether the card belongs to the carrier of the card at the time (fingerprint comparison), but also whether this card does enable a particular authorization to a certain action, such as the entering of a building. For this purpose, the card itself must also be subjected to monitoring and comparison as to whether particular markings, lines, or codes are located thereon which identify the carrier of the pass or card as an authorized carrier. In this case, by means of introducing the card into an appropriate reception slot of a monitoring appliance and by applying the finger of the carrier to a predetermined region, it may simultaneously be ascertained by the appliance (1) whether the card carrier has an identical fingerprint to that stored on the card and (2) whether the card has such lines or markings as are assigned to the carrier as an authorized person. In the case that testing has a positive result, it is possible, for instance, to effect an automatic opening of a door, so that access is provided to a building which is otherwise locked. One form of embodying an appliance enabling the attainment of these possibilities is shown for one embodiment of the invention in FIG. 10 and given reference numeral 70. It will be understood that the design and the external appearance of such a combined testing appliance may also be different. Thus it is solely the presence and the structural arrangement of the individual components which are present which is of interest here. In the case of the exemplary embodiment shown in FIG. 10, a first partial structure, described above, for performing a pattern comparison (fingerprint comparison) includes a lamp 71 with a lamp holder 71a and a condenser lens 72, which deflect the portion of the beam emitted by the lamp 71 onto a prism 73, which is disposed adjacent to a slanted forward area 74 of the appliance and in this exemplary embodiment serves the purpose of providing for the direct contact of the appropriate finger of the card carrier whose fingerprint pattern is to be compared with the pattern located on a card which the carrier has previously inserted into a reception opening located in the lower portion of the appliance and indicated by reference numerals 75. From this opening of the apparatus 75, the reception slit of a card holder 76 is accessable, this slit serving the purpose of receiving and correctly positioning the inserted card. Between the card holder 76 and the prism 73, which deflects the beam path of the lamp 71, there are not only two lenses 77 and 78, but also the moving search element or scanner 79, as it will be designated below, already mentioned above. In the preferred exemplary embodiment of the present invention, the scanner 79 includes two drive motors, for instance a first stepping motor 80 and a normal, rapid drive motor 81, whose object and relationship with the scanner elements will be discussed in further detail below.

After the irradiation of the fingerprint pattern area on the card, the beam path leaving the prism 73, which is deflected by the scanner 79, and of which only the middle beam 83 is shown, falls upon a further detector lens 84 and from there upon the actual detector 85, which converts the quantity of light falling upon it into an electrical, altenating-voltage-like output signal having pulses superimposed on it. This is shown once again in FIG. 12a. This partial system ascertains and tests whether the card belongs to the carrier of the card. The question of whether the card belongs to the overall testing system is answered by a supplementary form of the embodiment in the same appliance, which as shown in FIG. 10 has an approximately parallel beam path and the particular advantage of which is that it can also make use of the drive means, already present in any case, for the scanner. This second partial area for identification of a marking, code or some other symbol on the card and for testing as to the agreement of this symbol with some symbol stored physically in the appliance and which will be called the master symbol from here on out, is first provided with a condenser lens 86, which takes up the beam path which in this case leaves the lamp 71 at a right angle and carries this beam to a transparency 87. This transparency contains the master symbol, the correct presence of which on the card is also to be tested. The beam path then travels on to a lens 88 and to a second scanner 89, which may be identical in structure with the first scanner 79 and which can also make use of the drive motors 80 and 81 of the first scanner unless, as one alternative also covered by the scope of the invention provides, the beam path is optically deflected and passed through the first scanner 79 only, which in that case is the sole scanner present. From the second scanner 89, whose structure will be described further below, the beam, again shown as a middle beam 90, falls upon a deflection mirror 91 and from there is carried through lens 92 to the same card holder 76 where the beam 90 for the master symbol also passes through the inserted card. In fact, the beam passes through the inserted card at that location at which the master symbol is located in the vicinity of the card—the scanner 89 is provided for the sake of precisely locating this particular location—so that in the case of agreement, a second output detector 93 a corresponding output signal for the master symbol as well. A detector lens 94 also precedes the detector 93.

The course of this procedure over time is such that first, for a first period which may amount to ½ second, for instance, a test is performed as to whether the card belongs to the system; in a specialized usage, for instance, this can provide access to a building for the carrier of the card. As soon as the card has been properly tested as to the presence of the master symbol and has been found to be correct—during the course of this test, no additional rotary search movement is performed for the card holder 76 as well—then the testing of the fingerprint patterns as to their agreement begins.

The supplementary rotary search motion of the card holder with the aid of the driving means 82 is not necessary, because the card holder assures satisfactory positioning and insertion of the card having the master symbol, and the master symbol, in the form of the transparency 87, is already correctly adjusted inside the appliance. Accordingly, there is a further degree of freedom as to the multiplicity of possible embodiments and distortion of the master symbol, because the rotation by various degrees of angle represents a degree of freedom which, as a multiplicative factor, contributes to the substantial number of possibilities for varying embodiment of the master symbol and correspondingly for discrimination of the master symbol from other symbols. As a result of the common use of the motor drive for the scanner, of a common card holder, of a common optical system including at least the lamp, and of a common evaluation electronic system, substantial cost advantages are attained as well as advantages relating to the speed of testing, because two different criteria (whether the card belongs to the carrier, and whether the card belongs to the system) are tested and decided virtually simultaneously.

A further advantageous embodiment of the present invention is that the moving scanner and the possibilities which it provides for evaluating the output signal are improved by the provision of means enabling the furnishing of information as to the precise point in the X-Y plane at which scanning is being performed at exactly that time. On this point, the following general remark must be made: the clarity and unequivocal nature of the "GOOD" indication relating to the identification pulse, which appears in negative form, depends upon whether scanning is effected in a central area or in a rim area of the scanning plane. As a matter of fact, the size of the negative identification pulse—that is, the amplitude and the sharply defined appearance thereof—is a function of the scanning speed of the scanner. This scanning speed, however, varies and is a function of the radius, because as described in the primary application, the scanner comprising two wedge prisms rotatable relative to one another functions at a constant angular speed; however, when the radii are varying, this causes a difference in scanning speed. As a result of the relative rotation of the wedge prisms, the scanning is effected in the scanning plane (X-Y plane) in the form of a spiral moving toward the middle point (central area). Scanning in the rim area produces negative indentification pulses such as are shown in sketch form in FIG. 12a in the course of the total detector output signal and indicated by reference numeral 14. If scanning is performed in the central area, however, or approaches this central area, then distorted identification pulses 14' result, which as such can hardly be identified any longer in a practical sense, because their structure and frequency approach the order of magnitude of the general fundamental sine wave oscillation (see FIG. 12b).

It is accordingly advantageous to know precisely at what point scanning being effected by the scanner is taking place and where the scanner is located, so as to be able to take appropriate measures for evaluation.

To this end, discs 95, 96 or other suitable means rotate synchronously with the wedge prisms 16a, 16b of the scanner. These discs 95, 96 or other means enable various scanning devices 97 and 98 to ascertain the relative position of the wedge prisms 16a and 16b to one another. Scanning in the central area, given scanners made up of wedge prisms of this type, will in any case be effected whenever the scanners are in a complementary position relative to one another, such that a rectangular shape is described, because in this case the beam is practically not deflected and falls upon the middle area of the scanning plane. A maximum deflection occurs when the wedge prisms are in an opposite position, such as that sketched in FIG. 11.

In accordance with a preferred exemplary embodiment, the rotating discs 95, 96 are half transparent and half opaque, so that during rotation different light passage relationships are produced, which can be ascertained by optical sensors 97, 98. These optical sensors 97, 98 may for example be made up of one photo transistor and one light-emitting diode each, with the outputs of the two optical sensors 97, 98 being the rectangular pulses shown in FIG. 11 and given reference numerals 99, 100. The phase displacement of these two rectangular pulse trains 99, 100, which are produced on the basis of the rotations of the wedge prisms and the markings 95, 96 rotating therewith, correspond to the particular dynamic relative position of the wedge prisms 16a, 16b at that time during the scanning process, so that a phase detector 101 of conventional embodiment is capable of ascertaining at what instant the two rectangular pulse trains 99, 100, and thus the wedge prisms as well, are in phase with one another or are in a continuous phase displacement from one another amounting finally to 180°. A corresponding first output signal of the detector 101 ascertaining the phase displacement at a particular time is indicated by reference numeral 102, and this first output signal 102 indicates whether the relative phase displacement between the wedge prisms 16a and 16b is in the range between 0° and 180° or between 180° and 360°. At those locations at which the wedge prisms are rotated to one another by 180°—that is, in which they are in the position in which they supplement one another in a complementary fashion—the central-area scanning takes place: in a range of ±20° about the 180° phase displacement, as shown by the curve 103 in FIG. 111, the middle-area scanning is effected, which is either to be forbidden completely or which is to be encounted by such further steps as will assure perfectly satisfactory identification.

This detection of the relative phase ratios during the rotary motion of the scanner wedge prisms 16a and 16b enables the synchronization of the assessment systems in the electronic area to the phase displacement in the scanner prevailing at a particular time. In the case of the phase detector 101, which is supplied with the two rectangular output pulse trains 99, 100 of the optical sensors, this may be an operational amplifier/comparator having two inputs (negative input and positive input), which is so embodied that the signal log 0 is produced at the output of this operational amplifier from the point of phase displacement 0 up until the state of completely opposite phase displacement has been attained (phase displacement 180°). From this instant, the output signal log 1 is produced at the operational amplifier until the phase displacement has again attained 360° or 0°. From this curve 102, the curve 103 is then produced, for instance by means of a timing circuit which is accordingly synchronized by means of the appearance of the positive flanks of the pulse train 102, which appear each time at the point of 180°.

A first possibility for utilizing the central scanning area, made recognizable by an appropriate log 0 signal, in the curve 103 is presented if—in order to avoid this central, slow scanning process—a third wedge prism, for instance solenoid-controlled, is provided in the scanner area (not shown in the drawing) disposed from + or −20° about the 180° phase displacement within this period of time; during this period of time, this third wedge prism is brought by the solenoid into the path of the beam, as a result of which there is an immediate deflection into the rim area, with the corresponding consequence that there is a clear and precise possibility of identification for the negative identification pulse. The negative identification pulse then appears in this way, as shown in FIG. 12a, even when the two scanning prisms 16a, 16b of the scanner are displaced relative to one another locally by 180°, as may easily be understood. As a result of this synchronization of the dynamic course of movement of the scanner to the evaluation process, a continuous evaluation is possible without interruption, even when during the course of scanning the central area in the scanning plane is also repeatedly traversed.

As exemplary embodiment in the scanner area may be designed in such a way that, for instance, a rotational speed of 125 revolutions per second is produced for the wedge prism 16a, while the wedge prism 16b is then driven in such a way that it rotates approximately ½% faster. It will be understood that a balance, or an identical status, on the part of the wedge prisms 16a, 16b will then occur once each 200 revolutions. The wedge prism 16a rotating more slowly here provides the timing basis for this operation; a closed-loop automatic speed control device 104 is provided and assigned to the scanner 79.

The time interval between each two states of balance between the two wedge prisms 16a, 16b occuring during the dynamic revolution of the scanner may be designated as one scanning cycle, and this scanning cycle, as already mentioned, encompasses 200 revolutions of the prism determining the timing basis. In this period of time, the slightly faster prism 16b will have performed 200 revolutions. FIGS. 13a, 14a and 15a, each in conjunction with FIG. 13b, 14b and 15b, graphically illustrate the varying conditions depending upon whether scanning is performed in the outer area of the scanning spiral (FIGS. 13a, 13b) or whether a gradual approach is being made toward the central area, which is shown in FIGS. 15a, 15b.

If the identification can be performed in an outer area of the spiral corresponding to FIGS. 13a, 13b, then during one complete scanning cycle, which begins with the phase displacement of 0° between the two wedge prisms and lasts until the phase displacement of 0° has been attained once again (at 360°), two areas are produced in which the identification pulses 14 can appear. These two areas, designed 105a, 105b, are comparitively widely spaced and remote from the central scanning area 106. The reason for this is that as the result of the relative displacement of the two wedge prisms during the rapid, dynamic operation, the same relative positions relative to the beam deflection occur twice during one complete scanning cycle, separated by the complementary positions of the 180° phase displacement, as may be understood easily. Thus upon each rapid revolution of the two wedge prisms, one negative identification pulse is produced, which is at first of weak amplitude, because the relative status of the wedge prisms only gradually approaches the particular optimum geometric relative position at which the scanner can bring two patterns into maximal coincidence. There is accordingly a gradual increase in the identification pulse amplitude and a gradual decrease whenever the relative positions of the wedge prisms to one another leave the area at which the congruent coincidence or agreement of the two patterns is attainable. Given the rotational speed already noted of 125 revolutions per second on the part of the time-determining wedge prism 16a, the identification pulses appear at a time interval of 8 msec. If the area in which an identification is possible is approximately in the middle between the outer area of the spiral and the central area, such as is shown in FIGS. 14a, 14b, then the two identification pulse area 105a', 105b' approach together, and the absolute amplitude of the identification pulses themselves may become smaller because the scanning speed in the inner spiral area is also lower. As already noted, the rotational speed of the wedge prisms is of course constant, and therefore with a decreasing radius the absolute speed of the light beam passing over the scanning plane in a circular spiral fashion is lower, and accordingly the differences between the identification pulse and the accompanying fundamental oscillation signals and other interference signals are obliterated.

During scanning in the central area corresponding to FIGS. 15a, 15b, the two identification areas coincide as a common identification area 105'', which is then located in the region of + or −20° around the phase displacement point of 180°.

In the two scanning statuses shown in FIGS. 13a, 13b, 14a, 14b, identifications can be easily performed, that is, the testing of the identification pulse is effected in accordance with the criteria already described, and a "GOOD" indication is produced whenever the algorithm of the identification criteria exceeds a predetermined value. These supplementary identification criteria which result in this connection will be discussed in more detail below.

In the central area corresponding to FIGS. 15a, 15b, in principle there is no identification performed at first; however, the third wedge prism provided can be actuated by means of solenoid action in order to leave this central area. Preferably the third wedge prism is pushed into the beam path for purposes of deflection whenever the already described test criterion of identification pulse over fundamental oscillation (P/SG) is smaller than the identification criterion of identification pulse over direct-current level (P/DC).

It has already been noted in the primary application that the supplementary rotational search movement of the card holder occurs in order to obtain optimal amplitudes of the identification pulse even during a rotation of the two patterns (pattern being used as a general term) to be compared with one another. FIGS. 13a, 14a show that identification pulse areas 105a, 105b each appear twice during one complete scanning cycle from 0° to 360° (0°) of phase displacement, so that because the address or the dimension of the mutual phase displacement of the wedge prisms is known, the rotational searching movement of the card holder can also be synchronized with the course of scanner movement, in such a way that a new displacement/searching step of the card holder always takes place after ½ scanning cycle has been completed, so that the total identification process can be accelerated by a factor of two.

The verification of the fact that the identification algorithm is satisfactory and true can also be subjected to at least one further test criterion, adapted to the frequency of the sequential appearance of the individual identification pulses at a given scanning rotation speed on the part of the wedge prisms of the scanner. Given the rotational speed mentioned by way of example above on the part of the scanner wedge prisms, each identification pulse appears at an interval of 8 msec, and one further identification criterion may be that, as a minimum, three identification pulses will have to appear one after another, at an interval of 8 msec, in the non-central scanning area in order to permit the issuance of a "GOOD" indication. This identification criterion is useful because there is always the possibility, which cannot entirely be excluded, that a rapid finger movement, performed with the intention of counterfeiting, in the region of the prism 73 can cause the generation of particular pulses which the evaluation electronics may recognize as pertinent because they attain the desired amplitude. However, such pulses can certainly not be generated in the precise time interval as described above such as will occur during proper scanning, so that here again there is a perfectly satisfactory means of precluding counterfeiting.

A further identification criterion is that the gradual increase in the amplitude of sequential identification pulses when approaching the identification area is evaluated by means of the spiral scanning, and a "GOOD" indication is issued only when each subsequent identification pulse increases or decreases in a monotonous manner with respect to the preceding identification pulse.

Finally, a further and particularly preferred embodiment of the scanner is possible which eliminates even those problems resulting during scanning in the central area. In this embodiment, the two scanner wedge prisms are driven not with a rapid and only slightly different rotational speed; in stead, one of the wedge prisms, in FIG. 16 the wedge prism 16a', is considered to be practically quasi-stationary with respect to the dynamic scanning process. In other words, the first wedge prism 16a' rotates so slowly, or is driven incrementally by a stepping motor by angular amounts, in such a way that the second wedge prism 16b', which is driven at a higher rotational speed by a direct-current or alternating-current motor in continuous fashion, has performed at least one complete rotational and deflection movement in one portion of the scanning process before a noticeable continuation of this circular scanning region is performed by the quasi-stationary wedge prism. The result then in scanning the X-Y plane (scanning plane) is the effect that the first wedge prism 16a' shifts the middle point of a circular scanning motion about various predetermined locations, which are held quasi-stationary, while the wedge prism 16b' performs a rapid, circular scanning-searching movement about these locations, now doing so at the constant speed. In FIG. 16, in which the scanning plane is shown in plan view for the sake of better understanding and the wedge prisms are schematically shown in a lateral view, the circular path of the individual points M1, M2, M3 is designated by the letter M, while the paths of the rapid scanning movement, caused by the second wedge prism 16b', are designated S1, S2 . . . It can be seen that differences in speed can no longer occur during the dynamic scanning process in the course of one complete scanning cycle, because the shifting of the middle points M1, M2 . . . for the circular scanning-searching movement is effected by the first wedge prism 16a', which viewed from the standpoint of the rapid rotational movement of the second wedge prims 16b' is stationary, so that the speeds no longer overlap one another. The speed of the beam displacement effected by the second wedge prism 16b' is therefore constant at all points on the paths S1, S2 . . . , even when passing over the central area. The reason for this is that the radius about which the rapid searching rotational movements are performed is contant and describes the circle M having the points M1, M2 . . .

As a result of this new scanner embodiment, as an alternative embodiment, it is possible to eliminate scanning problems in the central area, so that it may be possible to eliminate some of the steps described above.

For the purpose of evaluating the additional test criteria which are also provided by the present invention, that is, the precise determination of intervals in the evaluation of at least three sequential identification pulses, a counter may be provided which only permits a configuration of this kind of an output signal at its outputs, or if it is embodied as a so-called Johnson counter it only issues a "GOOD" output signal after the arrival of a third sequential identification pulse, and a gate circuit is switched to procede the counter, the gate circuit opening at time intervals (8 msec.) determined by the speed of revolution, but is otherwise blocked. The control of the gate circuit may be effected with the aid of a monostable member, which for a given time interval determined by the speed of rotation of the prisms remains in its metastable state. The characteristics described below substantially relate to further embodiments of the fundamental system already described.

The optical bench shown in FIG. 17 for a test appliance comprises an output detector 120, which converts the incoming optical signal into an electrical signal; a preceding lens 121; the card holder 122, in which the identification card carrying the master symbol and the fingerprint is inserted; a further lens 123 preceding the card holder 122; the optical scanning system, that is, the scanner 124, whose structure may be identical, for example, to the preferred form of embodiment of the scanner shown in FIG. 16; a further lens 125; and an optical element 126 located in the optical beam path for both test criteria.

For performing the fingerprint comparison, a prism 127 is provided onto which the finger of the person being tested is placed, and which is illuminated via a lens 129 by its own illumination device 128. In the conventional manner, only the middle beam is shown in FIG. 17, but it is otherwise understood that the component of the optical bench and the test appliance variously mentioned above and below must not necessarily be in the particular form shown and at the particular position mentioned; instead, they are required only to the extent that the functioning of the test appliance makes it necessary for them to take part in performing the comparison processes according to the invention.

Specifically, it is of critical importance that except for the separate illumination system the other components of the optical bench, which in the illustrated embodiment are the elements 120-126, are common to the test appliance, and in a particularly advantageous embodiment of the invention, the images of the fingerprint and of the master symbol stored in memory and which are to be tested are located on the card at the same location, that is, in a superimposed optical position, as shown in FIG. 18. In FIG. 18, by way of example, the master symbol is represented by the rectangular frame 130, and the copy of the fingerprint is represented by the circle 131. The stored fingerprint and master symbol on the card are as a result completely indistinguishable from one another as to the multiplicity of lines located in this region; however, because of its particular embodiment, the test appliance is capable of generating appropriate identification pulses in the intended sequence over time of test conditions, and to evaluate these pulses, as will be described immediately below. The illumination system for the master symbol is indicated at 132 in FIG. 17. The transparency of the master symbol, which is kept stationary in the test appliance, being continuously stored in memory, is identified by the reference numeral 133.

For performing the test, it is assumed that the appliance first effects the agreement of the master symbol on the storage means or transparency 133 with the master symbol located at 130 on the card 134, which has been inserted into the card holder 122. Then, by way of a driver or amplifier circuit 135, first the lamp 136 for the test of the master symbol is triggered, and this lamp 136 is preferably made up of light-emitting diodes or LED, which again preferably operate in the infrared range. The light from the LEDs 136 passes through the transparency 133 and falls on the optical element 126, which in accordance with a preferred exemplary embodiment is a so-called beam splitter, which in this case is disposed stationary in the position shown with solid lines in the drawing. In this position, this optical element or beam splitter 126 deflects the master symbol beam falling on it at right angles and carries it to the further components 120-125. As a result of the scanning movement of the scanner 124, then the identification test is performed and if identity exists, then a finding is made of identical coincidence between the stored master symbol at 133 and the inserted master symbol 130 on the card 134. At the output of the detector 120, a first electrical signal is produced which is carried to the subsequent electronic evaluation circuit 137. The electronic evaluation circuit 137 is embodied such that to produce a "GOOD" indication having final validity, two identification pulses recognized in a timed sequence as correct must be detected and evaluated, these impulses deriving from the test of the master symbol and the test of the fingerprint.

After the performance of the master symbol test, as discussed immediately above, the test is then made as to the agreement of the fingerprints; preferably, at first, this test is made independently of whether a correct or an incorrect result has been produced in the testing of the master symbol immediately preceding. The second illumination device 128 having the lamp 139 is now triggered via the connecting line 138 from the electronic evaluation circuit 137, and the beam of light thus created, after reflection at the prism 137, which now contains a latent copy of the fingerprint lines of the finger 140 placed thereon, falls onto the optical element 126, passes through this without being affected, and undergoes the same treatment at the further elements 120–125; if there is agreement of the fingerprint detected by the prism 127 and the fingerprint stored on the card at 131, an appropriate identification pulse is produced at the output of the detector 120.

The testing of the output signal of the detector 120 may be effected in the same manner as has been discussed in detail above, wherein the case of identity of the patterns, the identification pulse is subjected to one or more of the various test criteria.

The electronic evaluation circuit 137 is embodied in such a way, or it can contain a microprocessor not discussed in further detail programmed such, that the course over time of the interrogation of the individual examination processes discussed above can be performed either in the sequence of comparison of the master symbol with the fingerprint, or in the reverse order.

The optical element 126 may advantageously be a semitransparent mirror, which permits a portion of the radiation falling upon it at a particular time to pass through it unhindered, and reflects a portion in accordance with optical laws. This optical element 126 can therefore be used without a change in position to perform both measurements with the illumination systems 128 and 132. However, it is also possible to embody the element 126 as a genuine mirror, which in performing measurement as to the agreement of the master symbol is disposed with the illumination system 132 is the position shown by solid lines in the drawing, and for performing the fingerprint comparison test, it is tilted out of the path of the beam into the position 126' indicated by broken lines in accordance with the direction of the arrow.

A further advantageous embodiment of the present invention provides for the master symbol to be represented in a particularly transparent manner, that is, so that it is basically indistinguishable, on the card 134 in the optically superimposed image 130, 131. The reason for this is that because of the invariability of the peripherial conditions resulting during comparison, that is, two stored patterns which are invariable over time are always compared with one another, one identification pulse of sufficient quality is always produced when there is unequivocal agreement. For this reason, and because of the superposition, even if the additional possibilities of distorting these images as discussed above are not made use of, then it is still impossible to detect the master symbol in the form of an image, even if someone possessing a genuine card having a superimposed master symbol and fingerprint representation tries to use such a card. It is noted solely for the sake of reference and for better understanding that this master symbol may be, for example, a further fingerprint copy, which may belong to some person in an important position in the particular business to which these cards belong. In that case, there will then be completely intermingled, confused lines of the superimposed representation on the card, so that it will be impossible to isolate these lines, and yet such lines would absolutely have to be isolated if counterfeiting were to be successful, because the appliance performs the test in a sequence separated over time, as discussed above, and on the one hand unequivocally determines the presence of the master symbol and on the other hand unequivocally determines the agreement of the fingerprints.

In a further advantageous embodiment of the present invention, some other conceivable opportunity for counterfeiting is precluded in that a supplementary sensor circuit 141 is provided, which is inserted into the feedback line for regulating the lamp brightness. This feedback line is represented in FIG. 1 by reference numeral 53, and it serves to regulate the lamp brightness in a closed-loop manner whenever a signal level which is too weak overall is produced at the output of the photo detector 120, this signal weakness being caused by excessive weakening of the light beam which enables the evaluation and comparison.

Now if an unauthorized attempt is made to produce appropriately strong identification pulses, which would then bring a "GOOD" indication, by rapidly raising and lowering the finger on the prism 127, then this causes not only the pulse-like generation of output signals at the detector 120 but automatically also causes a corresponding response on the part of the feedback circuit for lamp brightness. This is because the finger movement cannot be performed as rapidly as desired, rather, the frequency caused by such a finger movement will be located within the control response range of the regulating device for lamp brightness. It will be understood that this regulating circuit is so designed that it cannot have an equalizing effect on the frequencies and pulses which occur during the course of the measurement. It is accordingly possible to generate an alarm signal or an error indication by means of ascertaining the frequency of the fed-back regulating for lamp brightness by means of the circuit 141, whenever this frequency of the brightness fluctuations which are to be equalized is in the range resulting when rhythmical finger movements produce improper identification pulses. In this case, the entire system can be shifted into a status for error indication. The frequency for the detection of finger movements is approximately between 0 and a maximum of 100 Hz and thus lies outside the frequency band which occurs during the normal comparison, in the form of an alternating-voltage mixture at the output of the detector. The sensor circuit 141 has appropriate filters and systems which respond whenever brightness fluctuations of the lamp, having a frequency of this kind, are to be equalized.

A further preferred embodiment respecting the security from counterfeiting of the system is that master symbols stored in the appliance for comparison purposes may be disposed in various different rotary positions, with angular differences among them of 3°–4° being entirely sufficient. The angular rotation of the master symbol may be effected either by hand or by motor. If there is an unauthorized attempt to open the appliance for ascertaining the master symbol representation, then the master symbol abruptly returns to a zero position from which the actual rotary position used in comparison can no longer be ascertained. A possibility for preventing counterfeiting of this kind may be described as an absolute-angle rotary position. Furthermore, it is possible to produce the master symbol from among n partial symbols superimposed on one another. These partial symbols, as well, in addition to the absolute angle, may assume positions relative to one another which are also returned to a zero position in the case of a violent attempt to open the appliance.

With respect to the card, it is also possible to place thereon, in a superimposed representation, two or more fingerprints of one person, and possibly even of several persons; then the comparison system locates that copy of the fingerprint from among the superimposed fingerprint copies of the card which is intended to be compared and tested at that particular time, this being done with maximum reliability. In this manner, it is possible for the card carrier to be able to prove his identity by means of the placement of several fingers on the measuring prism of the appliance; however, it is also possible to use a card in this manner for two or even more persons.

A further means for improved discrimination and for prevention of counterfeiting, and in general to better utilize the selective possibilities and alternatives of the appliance, is that light may be used having various wave lengths, so that for instance the illumination may be polychromatic, but detection may be performed with monochromatic light. Detectors which respond only to irradiation with light of specific wave lengths or wave lengths bands are known. The use of relatively monochromatic detectors and/or light sources therefore provide even better possibilities for discrimination and evaluation.

Finally, a further preferred exemplary embodiment of the present invention provides for the storage in the test appliance of as many fingerprints as there are persons to be tested by a system of this kind in accordance with the invention, and where a decision has to be made as to whether access should be permitted to them, for instance access to a building.

Thus, it is possible, for example, to embody the appliance in such a way that the person to be tested at a particular time feeds a particular code, pertaining only to this person, into the appliance; this code may be a number code or even the person's own name. Then, out of the multiplicity of fingerprints stored in the appliance, the appliance selects the fingerprint which is suppose to agree with the fingerprint of the person who has just fed his code into the appliance, and transports this fingerprint into the vicinity of the card holder as described above. The test is then made in the usual manner, as described in detail above, and the appliance can provide access as soon as the testing process has ascertained the identity of the person in a satisfactory manner.

The storage of this multiplicity of fingerprints may be done in manifold ways. For instance, it is possible to store the fingerprints in the form of a roll of film at some remote location, and then to search for the appropriate fingerprint and carry it mechanically to the location where irradiation is performed for comparison purposes; alternatively, it is possible to transport only a beam of light to this irradiation location, the beam containing the copy of the stored fingerprint in latent form.

It is also possible to store the fingerprints by digital means, however, for instance using known ROMs or RAMs, in which case a fingerprint stored in digital fashion in this manner first must be converted into an analog reference value before the comparison, again preferably done optically, is performed. Generally expressed, the storage can therefore be either analog or digital, and the representation for comparison purposes must be made in an analog form.

I claim:

1. A method of comparing a first fingerprint pattern with a second fingerprint pattern formed by a recorded representation which comprises positioning said first and second fingerprint patterns relative to each other, directing a light beam from a lamp onto said first fingerprint pattern which light beam is reflected thereby, scanning said reflected light beam directed from said first fingerprint pattern by use of a rotatable double wedge prism scanner, including first and second spaced wedge prisms while rotating said first wedge prism at a rotational speed different from said second wedge prism, superimposing said scanned light beam onto said second fingerprint pattern, directing said light beam from said second fingerprint pattern onto a photoelectric conversion means to produce an electrical output signal including an identification pulse, directing said electrical output signal into an electronic evaluation device, comparing said electrical output signal with an adjustable threshold value, prior to threshold comparison, preparing and discriminating said electrical output signal by which an identification pulse resulting in an event of identity between said first and second fingerprint patterns is compared with at least one further electrical variable contained in said electrical output signal, relating said further electrical variable with said identification pulse and summing said compared identification pulse during a performance of a plurality of test criteria, producing at least one further signal derived from peripheral conditions during said comparison and comparing said derived signal in terms of a threshold value, whereby said identification pulse and said signal derived from peripheral conditions are utilized in an overall determination of matching said first and second fingerprints.

2. A method as defined by claim 1 characterized in that the test comparison is performed between an image obtained by application of a finger upon an optical refractive device at the instant of comparison, and a recorded representation of the same fingerprint on a card, pass, credit card, key-like card element, identification document, and the like.

3. A method as defined by claim 1, characterized in that the comparison of fingerprints is performed between two recorded fingerprint representations disposed on a carrier medium.

4. A method as defined by claim 1, characterized in that a recorded fingerprint representation or a fingerprint image is compared with at least two identical recorded representations in order to increase the reliability of identification.

5. A method as defined by claim 4, characterized in that the multiple comparison of an image or of a recorded representation is performed parallel and at substantially the same time (during a scanning in the region of the recorded representation).

6. A method as defined by claim 1, characterized in that a multiplicity of recorded fingerprint representations is compared in the region of the representations in sequence over time with different fingerprint images, obtained directly at the instant of comparison.

7. A method as defined by claim 1, characterized in that the image of the fingerprint obtained by means of reflection at a prism is subjected to a spiral searching movement in the plane of the recorded representation, by means of the rotation of said two wedge prisms associated, in such a manner that upon each occurrence of identical congruence of said image with the recorded representation, a distinct, different optical energy status is attained.

8. A method as defined by claim 1, characterized in that by means of the placement of the finger, whose fingerprint is to be compared, upon the prism, the internal reflective properties of the prism are varied in such a manner that in the case of identical congruence of the fingerprint reflection image with the recorded representation, a of maximum optical damping is attained which after photoelectric conversion of the optical beam into an electrical variable is perceivable as a negative identification pulse.

9. A method as defined by claim 8, characterized in that the output signal of the photo detector converting the optical energy is subjected in parallel to a multiplicity of test criteria, which include a comparison test of the amplitude of the negative identification pulse as compared with the amplitude of the fundamental oscillation present at the instant of appearance of the negative identification pulse (percentage wise correlation); a comparison test of the amplitude of the negative identification pulse with the amplitude of a higher-frequency interference signal ($-P/A$ test criterion); a test of the amplitude of positive pulses accompanying the negative identification pulse with the average value of the high-frequency interference signal; a comparison of the amplitude of the negative identification pulse with the height of the direct-current level (amplification) present in the detector signal; and, as needed, a measurement of the time interval (T) of the repeated appearance of the negative identification pulse.

10. A method as defined by claim 1, characterized in that a copy of a master symbol is associated with a copy of the recorded fingerprint on a card, the master symbol being compared with a master symbol copy disposed in the test appliance, this comparison being performed at a time interval relative to the comparison of the fingerprints.

11. A method as defined by claim 10, characterized in that the copies of the fingerprint and of the master symbol on the card are disposed at the same location, being superimposed upon one another.

12. A method as defined by claim 10, characterized in that the superimposed representation of the fingerprint on the one hand and of a master symbol on the other on the identification carrier is simultaneously optically irradiated and detected, but, the comparison with the fingerprint of the person in possession of the identification carrier or with the master symbol stored in memory is performed in a sequence over time.

13. A method as defined by claim 12, which comprises triggering said lamp for the performance of a master symbol comparison so that a beam carrying an image of the master symbol is carried from a given location to a common optical beam path and to the light detector, and finally, after evaluation of an identification pulse resulting from the master symbol comparison, the lamp for the fingerprint is triggered and the beam latently carrying an image of the fingerprint is carried at the same location along the common optical path to the light detector.

14. A method as defined by claim 1 in which the recorded representation is subjected to a mechanical shifting movement in order to optimize the result of comparison by means of geometrical correction of the identify of congruence attained at a particular time.

15. A method as defined by claim 14, characterized in that a first value of the comparing measurement result is stored in an intermediate fashion and is compared with a second value appearing subsequent to the mechanical, corrective shifting movement of the card holder.

16. A method as defined by claim 1 which comprises varying the lamp brightness, so that a constant level of light required for the comparison is maintained.

17. A method as defined by claim 1 which comprises introducing an optical distortion device (lenses, telescope with cylindrical lenses) into the beam path of the optical comparison device, so that the path of the beam is distorted in a manner of a specialized optical code, to protect against counterfeiting, both during the production of the recorded pattern and during the measurement process.

18. A method as defined by claim 1 characterized in that a phase displacement of said wedge prisms of a scanner which rotate during a searching movement at a slightly different speed from one another is detected by means of optical sensors and converted into associated rectangular pulse trains, in order to determine a given period of time during one complete scanning cycle in which the scanning is effected at a low linear speed substantially in the central region of a scanning plane.

19. A method as defined by claim 18, characterized in that upon reaching a central region of the scanning plane on the part of the optical beam scanning the patterns, the identification process is interrupted.

20. A method as defined by claim 18, characterized in that upon reaching the central area in the scanning cycle, a further optical element (third wedge prism) is introduced which deflects the beam path into the rim of the scanning area.

21. A method as defined by claim 20, characterized in that a solenoid transporting the third wedge prism is actuated by means of the output of a phase comparator.

22. A method as defined by claim 20, characterized in that the third wedge prism is introducted into the beam path only whenever the result of the test criterion identification pulse over fundamental osciallation (P/SG) is smaller than the result of the test criterion identification pulse over direct-current level (P/DC).

23. A method as defined by claim 1, characterized in that one complete scanning cycle of the searching movement is terminated at such time as said wedge prisms of a scanner newly attain a geometric balance, wherein the time interval determined by the basic rotation speed, between the identification pulses of each identification area appearing twice during one complete scanning cycle is utilized as a further test criterion for the accuracy of the "GOOD" indication.

24. A method as defined by claim 23, characterized in that at leat three sequential identification pulses in the non-central scanning area are evaluated as the requirement for a further test criterion within a given time interval.

25. A method as defined by claim 1, characterized in that the rotational search movement of the card holder is adapted such that a renewed incremental rotation movement occurs each time one identification area has been completed within one total scanning cycle, that is, the renewed incremental rotation movement occurs twice during one scanning cycle.

26. A method as defined by claim 1, characterized in that the search movement of the optical light beam deflected by the scanner is effected such that the rotational movement of one of the optical elements forming the scanner is held quasistationary with respect to the rapid constant rotational movement of the second optical element, in such a manner that a variation of the deflection angle which is noticable with the respect to the result of scanning is effected by means of a slow rotational movement, which is either steady or incrementally, on the part of the first optical partial element only after the second optical partial element has executed at least one complete, circular deflection procedure, also overlapping the central scanning area, upon the light beam, having a constant linear seed in the associated partial scanning area.

27. An apparatus for comparing patterns of invariable form such as a first fingerprint compared with a second fingerprint displayed on a card, a path, a credit card, a key-like card element, and identification documents which comprises:

means for presenting a first pattern relative to a second pattern, a light source for producing a light beam, optical means for directing said light beam onto said first pattern, optical means for directing light reflected from said first pattern along an optical path to said second pattern, an optical scanner positioned in said light path between said first pattern and said second pattern, said optical scanner including first and second spaced wedge prisms having parallel faces with oppositely directed vertices, means for rotating each of said first and second wedge prisms at different rotational speeds, an optical detector placed in said optical path to detect light directed thereon from said first and second patterns and to produce an electrical output signal representative of light incident thereon, an electrical evaluation means for receiving said output signal from said optical detector, said electrical evaluation means including a plurality of comparison test circuits each representing one test criterion for comparison testing an identification pulse which results from said first pattern matching said second pattern, said output signal including electrical variables such as a sine wave fundamental oscillation signal, a high-frequency harmonic oscillation signal, a direct-voltage signal, and said plurality of comparison test circuits produce output signals which connect with a comparator for the purpose of comparing said output signals from said comparison test circuits with a given safety threshold.

28. An apparatus as defined by claim 27, characterized in that a multiplicity of circuit blocks representing test criteria are provided, whose outputs are connected with one common summing amplifier (43) which is followed by the comparator (45).

29. An apparatus as defined by claim 27, characterized in that as the first test criterion, a circuit layout (23) for determining the percentage-wise correlation ratio of the identification pulse amplitude to the fundamental oscillation is provided.

30. An apparatus as defined by claim 29, characterized in that the circuit layout for determining the percentage-wise correction ratio includes a first subtracting amplifier (34) having two inputs, whose first (negative) input is carried to an unaltered detector output signal (DS) and whose other input is connected with an output (fundamental oscillation signal SG) of a phase-corrected low-pass filter (32, 33), whose input is likewise supplied with the detector output signal, further that the output of the subtracting amplifier (34) is connected with one input of an analog divider circuit (35), whose other input is newly supplied with the fundamental oscillation (SG) and that the output of the divider circuit, if necessary after amplification, is connected with a peak detector (37) which for a predetermined period of time, in the manner of a memory, holds at a fixed value of a maximum amplitude value which may occur.

31. An apparatus as defined by claim 27, characterized in that, as a further test criterion, a circuit block (24) is provided for determining the ratio between the amplitude of the negative peak pulse and the average value of the high-frequency interference variable (−P/A), comprising an analog divider circuit (38), whose first input is supplied directly with the output signal of the subtracting amplifier (34) during the ascertainment of the percentage-wise correction ratio, and whose other input is supplied with this signal by way of a low-pass filter (39), with a further peak detector (41) being switched subsequent to the divider circuit (38).

32. An apparatus as defined by claim 27, characterized in that, as a further test criterion, a circuit block (24) is provided for determining the value of the ratio between the amplitude of positive supplementary pulses appearing adjacent to the negative identification pulse to the average value of the high-frequency interference signal (+P/A), comprising a further subtracting amplifier (42), to whose positive input the detector signal is supplied and to whose other input the fundamental, oscillation signal (SG) is supplied, having a divider circuit (38') switched subsequent to the subtracting amplifier (42), the first input of which divider circuit is supplied directly with the output signal of the subtracting amplifier (42) and whose other input is supplied with this output by way of a low-pass filter (39'), the analog divider circuit (38') having a peak detector (41') switched subsequent to it.

33. An apparatus as defined by claim 27, characterized in that, as a further test criterion, a circuit layout (26) is provided for ascertaining the amplitude ratio of the negative identification pulse to the direct-current level (−P/DC), including an analog divider circuit, to the first input of which the detector signal (DS) is supplied by way of a high-pass filter and to the other input of which the same detector signal (DS) is supplied by way of a low-pass filter, with a peak detector switched subsequent to the analog divider circuit.

34. An apparatus as defined by claim 27, characterized in that, as a further test criterion, a circuit (27) is provided for determining the time intervals (T), located within a predetermined period, between the appearances of the negative identification pulses, including a monostable timing element, triggered by each negative identification pulse, having a subsequent evaluator circuit, which upon the exceeding of a predetermined period of time or upon the appearance of a multiplicity of pulses within the predetermined period of time, issues an error indication.

35. An apparatus as defined by claim 27, characterized in that the output signals (−P/DS, −P/A; +P/A; −P/SG) of the peak detectors after corresponding weighting as necessary, are connected with the inputs of a subsequent summing amplifier, whose total output signal is supplied to a comparator circuit, to the other input of which a safety threshold signal is supplied by a threshold circuit, and that switched subsequent to the comparator is a logical decision circuit which is supplied in addition to the final identification signal (IS) with supplementary signals indicating satisfactory functioning of the total system.

36. An apparatus as defined by claim 27, characterized in that an intermediate memory circuit is connected with the output of the summing amplifier, that a further mechanical corrective device is provided which includes a stepping motor and imparts to the card holder a supplementary movement in the X-Y coordinate plane in order to optimize the identity of congruence between the copy and the recorded representation, wherein the stepping motor is triggered by a comparator to the two inputs of which, respectively, a first and a second output signal of the summing amplifier, resulting after the mechanical adjustment effected by the stepping motor, are delivered from the sample and hold circuit.

37. An apparatus as defined by claim 27, characterized in that a closed-loop lamp brightness circuit is provided, which follows up the lamp brightness in accordance with the level of the electrical signal produced at the output of the photo detector.

38. An apparatus as defined by claim 27, characterized in that optical distortion means (54) are disposed in the beam path between the first pattern and the second pattern such as a recorded representation, these means distorting the optical beam in accordance with a predetermined optical code, for the purpose of preventing counterfeiting, both during the one-time preparation of the recorded representation (1) and during the repeated comparison of the first pattern with the recorded representation.

39. An apparatus as defined by claim 38, characterized in that the optical distortion means (54) are a telescope-like device having cylindrical lenses.

40. An apparatus as defined by claim 27, characterized in that a further evaluation device is provided in a common housing (70) for the opto-electrical comparison of a further master symbol, located on the card, with a master symbol (transparency 87) stored in memory in the appliance, this further evaluation device utilizing at least parts of the optical and/or electronic equipment of the pattern comparison system.

41. An apparatus as defined by claim 40, characterized in that, originating from a common lamp (71), a separate beam is split off and directed through the transparency (87) carrying the master symbol, that a moving scanner (89) is switched subsequent to the transparency (87), and that deflection devices (91, 92) are provided which project the beam path directed through the transparency (87) onto a separate detector system (93, 94), through a corresponding region of the card, for the purpose of evaluating the master symbol.

42. An apparatus as defined by claim 41, characterized in that the scanner for a identification of a master symbol is driven by a motor means which also drive a scanner intended for the comparison of patterns.

43. An apparatus as defined by claim 41, characterized in that supplementary deflection means are provided, which direct the beam intended for the master symbol comparison through the single existing scanner which at a later time serves the purpose of comparing the patterns.

44. An apparatus as defined by claim 40, characterized in that for the purpose of security against counterfeiting the master symbol stored in memory in the appliance is disposed at a predetermined rotation angle (absolute rotational angle) relative to a zero position, this angle not being recognizable from the outside, to which zero position the master symbol can be returned in case of such an event as an attempt to open the appliance by force.

45. An apparatus as defined by claim 40, characterized in that for the purpose of security against counterfeiting the master symbol comprises partial symbol areas superimposed upon one another, each assuming relative angles, adjustable in a predetermined manner, relative to one another and to a zero position, in addition to the absolute angle position, the relative angles also being capable of being returned to the zero position in case of an attempt to open the appliance by force.

46. An apparatus as defined by claim 27, characterized in that a switchover device (U1) is provided which two inputs whose two inputs are connected with a output of the detector system responsible for the pattern comparison and with a detector system for the master symbol comparison and whose output signals are carried in sequence to the one, common evaluation logic.

47. An apparatus as defined by claim 27, characterized in that markings are associated with the drive means for the wedge prisms, or with the wedge prisms themselves, that opto-electrical systems (light-emitting diode, photo transistor) scanning the markings are provided, which generate output pulse trains corresponding to the rotary movement of the respective prism, and that a phase comparison device (101) is provided which generates an output signal related to the scanning of the central area of the scanning plane.

48. An apparatus as defined by claim 47, characterized in that the markings are embodied by discs, which are partially transparent and partially opaque, revolving in synchronism with the wedge prisms.

49. An apparatus as defined by claim 47, characterized in that the output signal of the phase comparison device (101) is delivered to a solenoid control means, which introduces a third wedge prism into the beam path in order to avoid a central scanning operation.

50. An apparatus as defined by claim 27, characterized in that a closed-loop automatic speed control means (104) is provided in such a manner that one of the wedge prisms rotates with a constant rotational speed and the other wedge prism rotates with a slightly faster speed.

51. An apparatus as defined by claim 27, characterized in that a first wedge prism of the scanner is driven by drive means in a quasi-stationary manner with respect to said second wedge prism executing a rapid rotational movement, in such a manner that the guidance of the scanning beam is effected in a circular manner in the scanning plane with a constant speed which also passes over the central area, with a gradual, steady shifting or with a shifting effected by means of an incremental stepping movement, along a curve of constant radius predetermined by the movement of the first wedge prism.

52. An apparatus as defined by claim 27, characterized in that the recorded representation of the fingerprint and the representation of a master symbol on a card are disposed at a common location and are superimposed upon one another and that the test appliance has an optical bench having a common beam path for the optical detection and performance of comparison, beginning with an element combining the optical beam for the performance of the fingerprint comparison and the comparison of the master symbol up to the common output detector and further has illumination devices generating beams which are at first separated and said illumination devices being triggered in a sequence over time, these illumination devices being intended respectively for the fingerprint comparison and the master symbol comparison.

53. An apparatus as defined by claim 52, characterized in that the optical element combining the beam from the illumination device respectively for the fingerprint comparison and the master symbol comparison is a movable tilting mirror or a semitransparent element (beam splitter).

54. An apparatus as defined by claim 52 or 53, characterized in that the illumination means of the illumination device are light-emitting diodes.

55. An apparatus as defined by claim 27, characterized in that a sensor circuit is switched in a feedback line from the electronic evaluation circuit to a trigger circuit of the illumination means for brightness regulation, which sensor circuit detects abrupt voltage surges in the feedback line, caused by a counterfeiting attempt and compensating for brightness fluctuations, and evaluates them for the purpose of error recognition.

56. An apparatus as defined by claim 27, characterized in that the card has the superimposed representation of two or more fingerprints of one or more persons who are carriers of the card.

57. An apparatus as defined by claim 27, characterized in that for the purpose of increasing the distinguishing characteristics for discriminating purposes, the illumination is effected with monochromatic or polychromatic light, and detectors are provided which respond to a relatively monochromatic light frequency band.

58. An apparatus as defined by claim 27, characterized in that the pattern of the fingerprint or of the master symbol, instead of being placed on the card, is stored in memory in either analog or digital fashion in the appliance and is transportable to the location for comparison when a carrier code is furnished.

59. An apparatus as defined by claim 58, characterized in that the patterns are stored in memory in the appliance in analog or digital fashion and are furnished for comparison purposes in an analog fashion.

60. An apparatus as defined by claim 27, characterized in that the light-generating area of the light source (lamp spiral), located in the optical axis, is focused in such a manner that upon the scanning movements of the wedge prisms an optical shift in position with respect to the photodetector is avoided.

* * * * *